US012408207B2

(12) United States Patent
Sen et al.

(10) Patent No.: US 12,408,207 B2
(45) Date of Patent: Sep. 2, 2025

(54) DEMODULATION REFERENCE SIGNAL CONFIGURATION FOR UPLINK MESSAGES

(71) Applicant: QUALCOMM Incorporated, San Diego, CA (US)

(72) Inventors: Pinar Sen, San Diego, CA (US); Yongjun Kwak, San Diego, CA (US); Wei Yang, San Diego, CA (US); Hwan Joon Kwon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 362 days.

(21) Appl. No.: 17/844,554

(22) Filed: Jun. 20, 2022

(65) Prior Publication Data

US 2023/0413339 A1  Dec. 21, 2023

(51) Int. Cl.
*H04W 74/0833* (2024.01)
*H04L 5/00* (2006.01)
*H04W 72/0453* (2023.01)
*H04W 74/00* (2009.01)
*H04W 74/08* (2009.01)

(52) U.S. Cl.
CPC ....... *H04W 74/0841* (2013.01); *H04L 5/0051* (2013.01); *H04W 72/0453* (2013.01); *H04W 74/004* (2013.01); *H04W 74/0866* (2013.01)

(58) Field of Classification Search
CPC ......... H04W 74/0841; H04W 72/0453; H04W 74/004; H04W 74/0866; H04L 5/0051; H04L 1/0075; H04L 1/0057
See application file for complete search history.

(56) References Cited

U.S. PATENT DOCUMENTS

| 10,609,735 | B2 | 3/2020 | Ko et al. |
| 11,212,053 | B2 | 12/2021 | Manolakos et al. |
| 2020/0267774 | A1* | 8/2020 | Vos .................. H04W 74/0833 |

(Continued)

FOREIGN PATENT DOCUMENTS

WO  WO-2022078511 A1  4/2022

OTHER PUBLICATIONS

International Search Report and Written Opinion—PCT/US2023/024966—ISA/EPO—Sep. 25, 2023.
(Continued)

*Primary Examiner* — Yu-Wen Chang
(74) *Attorney, Agent, or Firm* — Holland & Hart LLP

(57) ABSTRACT

Methods, systems, and devices for wireless communications are described. A user equipment (UE) may receive control signaling indicating a demodulation reference signal (DMRS) configuration for an uplink message that may indicate for the UE to refrain from including DMRS in at least a first portion of the uplink message based on the DMRS configuration. The UE may encode the uplink message without the DMRS in at least the first portion of the uplink message in accordance with the DMRS configuration. The UE may transmit the uplink message based on encoding the uplink message, and a network entity may receive and decode the uplink message. In some examples, the network entity may receive signaling that includes a set of uplink messages from different UEs. As such, the network entity may decode each, using a respective Reed-Muller (RM) code in accordance with a multi-user decoding algorithm.

29 Claims, 21 Drawing Sheets

(56) References Cited

U.S. PATENT DOCUMENTS

| | | | |
|---|---|---|---|
| 2020/0366451 A1* | 11/2020 | Lei | H04L 5/0094 |
| 2021/0014900 A1* | 1/2021 | Lei | H04W 52/42 |
| 2021/0184697 A1 | 6/2021 | Yang et al. | |
| 2021/0289561 A1* | 9/2021 | Liu | H04W 74/0833 |
| 2021/0315016 A1* | 10/2021 | Taherzadeh Boroujeni | H04W 74/0833 |
| 2021/0378027 A1* | 12/2021 | Wang | H04W 36/0077 |
| 2021/0410182 A1 | 12/2021 | Zhang et al. | |
| 2022/0132595 A1* | 4/2022 | Ko | H04L 5/0048 |
| 2022/0190906 A1* | 6/2022 | Haghighat | H04W 24/08 |
| 2022/0191937 A1* | 6/2022 | Lei | H04L 5/0091 |
| 2022/0287107 A1* | 9/2022 | Kim | H04W 72/0453 |
| 2022/0369375 A1* | 11/2022 | Lin | H04W 74/004 |
| 2023/0208556 A1* | 6/2023 | Zhang | H04J 13/12 375/295 |
| 2023/0291523 A1* | 9/2023 | Hasegawa | H04L 5/0094 |
| 2023/0318686 A1* | 10/2023 | Kwak | H04B 7/088 455/101 |
| 2024/0048427 A1* | 2/2024 | Zhang | H04L 5/0044 |

OTHER PUBLICATIONS

Nokia, et al., "On 2-step RACH Channel Structure", 3GPP TSG RAN WG1 #96, R1-1902135, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, XP051599830, pp. 1-8, Sections 1 and 2.

* cited by examiner

DEMODULATION REFERENCE SIGNAL CONFIGURATION FOR UPLINK MESSAGES

FIELD OF TECHNOLOGY

The following relates to wireless communications, including demodulation reference signal (DMRS) configuration for uplink messages.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support demodulation reference signal (DMRS) configuration for uplink messages. For example, the described techniques provide for a network entity and a user equipment (UE) to decrease DMRS port leakage by operating in accordance with techniques for a DMRS configuration with respect to uplink messages. In some implementations, the network entity may configure the UE to perform a non-coherent physical uplink shared channel (PUSCH) transmission using Reed-Muller (RM) coding techniques. As such, the UE may encode a signal in accordance with a configured RM code and transmit the encoded signal to the network entity. On the decoding side at the network, the network entity may use non-coherent decoding on one or more encoded signals from multiple UEs in accordance with a multi-user decoding algorithm.

Additionally, or alternatively, the network entity may perform channel estimation for a PUSCH using an associated physical random access channel (PRACH) portion of the uplink message. For example, the network entity may configure a UE to use a full DMRS, a partial DMRS, or no DMRS such as when transmitting a first message (e.g., Msg-A) in a PRACH procedure. In examples where the UE is configured to not transmit DMRS, the network entity may perform channel estimation from the PRACH preamble and extrapolate channel coefficients to use for resource elements of the associated PUSCH. In some examples, the network entity may configure the UE to apply a comb structure when transmitting the PRACH preamble. In some examples, the network entity may configure the UE to transmit a partial DMRS in frequency ranges not covered by the PRACH. In some examples, the network entity may configure the UE to transmit a full DMRS in symbols at the end of a slot and after transmission of the PUSCH.

A method for wireless communications at a UE is described. The method may include receiving control signaling indicating a DMRS configuration for an uplink message, where the control signaling further indicates that the UE is to refrain from including DMRSs in at least a first portion of the uplink message based on the DMRS configuration, encoding the uplink message without the DMRSs in at least the first portion of the uplink message in accordance with the DMRS configuration, and transmitting the uplink message based on encoding the uplink message.

An apparatus for wireless communications at a UE is described. The apparatus may include a processor, memory coupled with the processor, and instructions stored in the memory. The instructions may be executable by the processor to cause the apparatus to receive control signaling indicating a DMRS configuration for an uplink message, where the control signaling further indicates that the UE is to refrain from including DMRSs in at least a first portion of the uplink message based on the DMRS configuration, encode the uplink message without the DMRSs in at least the first portion of the uplink message in accordance with the DMRS configuration, and transmit the uplink message based on encoding the uplink message.

Another apparatus for wireless communications at a UE is described. The apparatus may include means for receiving control signaling indicating a DMRS configuration for an uplink message, where the control signaling further indicates that the UE is to refrain from including DMRSs in at least a first portion of the uplink message based on the DMRS configuration, means for encoding the uplink message without the DMRSs in at least the first portion of the uplink message in accordance with the DMRS configuration, and means for transmitting the uplink message based on encoding the uplink message.

A non-transitory computer-readable medium storing code for wireless communications at a UE is described. The code may include instructions executable by a processor to receive control signaling indicating a DMRS configuration for an uplink message, where the control signaling further indicates that the UE is to refrain from including DMRSs in at least a first portion of the uplink message based on the DMRS configuration, encode the uplink message without the DMRSs in at least the first portion of the uplink message in accordance with the DMRS configuration, and transmit the uplink message based on encoding the uplink message.

In some examples of the method, apparatuses, and non-transitory computer-readable medium described herein, encoding the uplink message may include operations, features, means, or instructions for encoding, using a RM code, the uplink message without the DMRSs included in the first portion in accordance with the DMRS configuration.

In some examples of the method, apparatuses, and non-transitory computer-readable medium described herein, the DMRS configuration includes a field indicating that the UE may be to refrain from including the DMRSs in the first portion of the uplink message.

In some examples of the method, apparatuses, and non-transitory computer-readable medium described herein, the DMRS configuration includes a field indicating a low-density parity-check code and a RM code for the UE to use for encoding the uplink message and the field may be included in an uplink channel resource information element.

Some examples of the method, apparatuses, and non-transitory computer-readable medium described herein may further include operations, features, means, or instructions for selecting a PRACH preamble to include in the uplink message and generating a scrambling identification associated with the UE based on the PRACH preamble, or based on radio resource control signaling (RRC) indicating the scrambling identification, or both, where encoding the uplink message may be based on the scrambling identification.

In some examples of the method, apparatuses, and non-transitory computer-readable medium described herein, receiving the DMRS configuration may include operations, features, means, or instructions for receiving an indication of whether the UE may be to include the DMRSs in a second portion of the uplink message on a frequency bandwidth that may be covered by a random access channel of the uplink message, where the random access channel may be included in the first portion of the uplink message.

In some examples of the method, apparatuses, and non-transitory computer-readable medium described herein, receiving the indication may include operations, features, means, or instructions for receiving a first configuration indicating for the UE to include one or more demodulated reference signals in each frequency resource of the frequency bandwidth covered by the random access channel, receiving a second configuration indicating for the UE to include the one or more demodulated reference signals in a subset of frequency resources of the frequency bandwidth covered by the random access channel, and receiving a third configuration indicating for the UE to refrain from including demodulated reference signals in the second portion of the uplink message.

In some examples of the method, apparatuses, and non-transitory computer-readable medium described herein, receiving the DMRS configuration may include operations, features, means, or instructions for receiving an indication of a PRACH comb pattern to apply to the first portion of the uplink message.

In some examples of the method, apparatuses, and non-transitory computer-readable medium described herein, encoding the uplink message may include operations, features, means, or instructions for encoding the uplink message without the DMRSs in any portion of the uplink message in accordance with the DMRS configuration.

In some examples of the method, apparatuses, and non-transitory computer-readable medium described herein, encoding the uplink message may include operations, features, means, or instructions for encoding the first portion of the uplink message in accordance with a PRACH comb pattern based on the DMRS configuration.

In some examples of the method, apparatuses, and non-transitory computer-readable medium described herein, encoding the uplink message may include operations, features, means, or instructions for encoding the uplink message to include one or more DMRSs in a second portion of the uplink message in accordance with the DMRS configuration.

In some examples of the method, apparatuses, and non-transitory computer-readable medium described herein, encoding the uplink message may include operations, features, means, or instructions for encoding the second portion of the uplink message to include the one or more DMRSs at a start or at an end of the second portion in accordance with the DMRS configuration.

In some examples of the method, apparatuses, and non-transitory computer-readable medium described herein, encoding the uplink message may include operations, features, means, or instructions for encoding the second portion of the uplink message to include the one or more DMRSs in a set of frequency resources without random access channel signals in accordance with the DMRS configuration.

In some examples of the method, apparatuses, and non-transitory computer-readable medium described herein, encoding the uplink message may include operations, features, means, or instructions for encoding the second portion of the uplink message to include the one or more DMRSs in a set of frequency resources that include random access channel signals in the first portion based on the DMRS configuration.

In some examples of the method, apparatuses, and non-transitory computer-readable medium described herein, the DMRS configuration may be based on an amount of Doppler spread at the UE.

In some examples of the method, apparatuses, and non-transitory computer-readable medium described herein, transmitting the uplink message may include operations, features, means, or instructions for transmitting a PRACH in a first set of frequency resources in the first portion of the uplink message in accordance with the DMRS configuration and transmitting an uplink shared channel in a second set of frequency resources in a second portion of the uplink message in accordance with the DMRS configuration, where the first set of frequency resources and the second set of frequency resources include a same set of frequency resources or a subset of same frequency resources.

In some examples of the method, apparatuses, and non-transitory computer-readable medium described herein, the DMRS configuration may be based on the first set of frequency resources including the second set of frequency resources.

In some examples of the method, apparatuses, and non-transitory computer-readable medium described herein, the DMRS configuration may be based on the second set of frequency resources including the first set of frequency resources.

In some examples of the method, apparatuses, and non-transitory computer-readable medium described herein, receiving the control signaling may include operations, features, means, or instructions for receiving an RRC message including the DMRS configuration for the uplink message.

A method for wireless communications at a network entity is described. The method may include transmitting control signaling indicating a DMRS configuration for an uplink message, where the control signaling further indicates that a UE is to refrain from including DMRSs in at least a first portion of the uplink message based on the DMRS configuration, receiving the uplink message without the DMRSs in at least the first portion of the uplink message in accordance with the DMRS configuration, and decoding the uplink message based on the DMRS configuration.

An apparatus for wireless communications at a network entity is described. The apparatus may include a processor, memory coupled with the processor, and instructions stored in the memory. The instructions may be executable by the processor to cause the apparatus to transmit control signaling indicating a DMRS configuration for an uplink message, where the control signaling further indicates that a UE is to refrain from including DMRSs in at least a first portion of the uplink message based on the DMRS configuration, receive the uplink message without the DMRSs in at least the first portion of the uplink message in accordance with the DMRS configuration, and decode the uplink message based on the DMRS configuration.

Another apparatus for wireless communications at a network entity is described. The apparatus may include means for transmitting control signaling indicating a DMRS configuration for an uplink message, where the control signaling further indicates that a UE is to refrain from including DMRSs in at least a first portion of the uplink message based on the DMRS configuration, means for receiving the uplink message without the DMRSs in at least the first portion of the uplink message in accordance with the DMRS configuration, and means for decoding the uplink message based on the DMRS configuration.

A non-transitory computer-readable medium storing code for wireless communications at a network entity is described. The code may include instructions executable by a processor to transmit control signaling indicating a DMRS configuration for an uplink message, where the control signaling further indicates that a UE is to refrain from including DMRSs in at least a first portion of the uplink message based on the DMRS configuration, receive the uplink message without the DMRSs in at least the first portion of the uplink message in accordance with the DMRS configuration, and decode the uplink message based on the DMRS configuration.

Some examples of the method, apparatuses, and non-transitory computer-readable medium described herein may further include operations, features, means, or instructions for receiving a signal including a set of uplink messages from different UEs, where each uplink message of the set of uplink messages may be associated with a RM code.

In some examples of the method, apparatuses, and non-transitory computer-readable medium described herein, decoding the uplink message may include operations, features, means, or instructions for decoding, using a respective RM code, the uplink message, where the uplink message may be without the DMRSs included in the first portion of the uplink message in accordance with the DMRS configuration and canceling the decoded uplink message from the signal including the set of uplink messages in accordance with a multi-user decoding algorithm.

In some examples of the method, apparatuses, and non-transitory computer-readable medium described herein, the DMRS configuration includes a field indicating a low-density parity-check code and a RM code for the UE to use for encoding the uplink message and the field may be included in an uplink channel resource information element.

DETAILED DESCRIPTION

Figure 1:
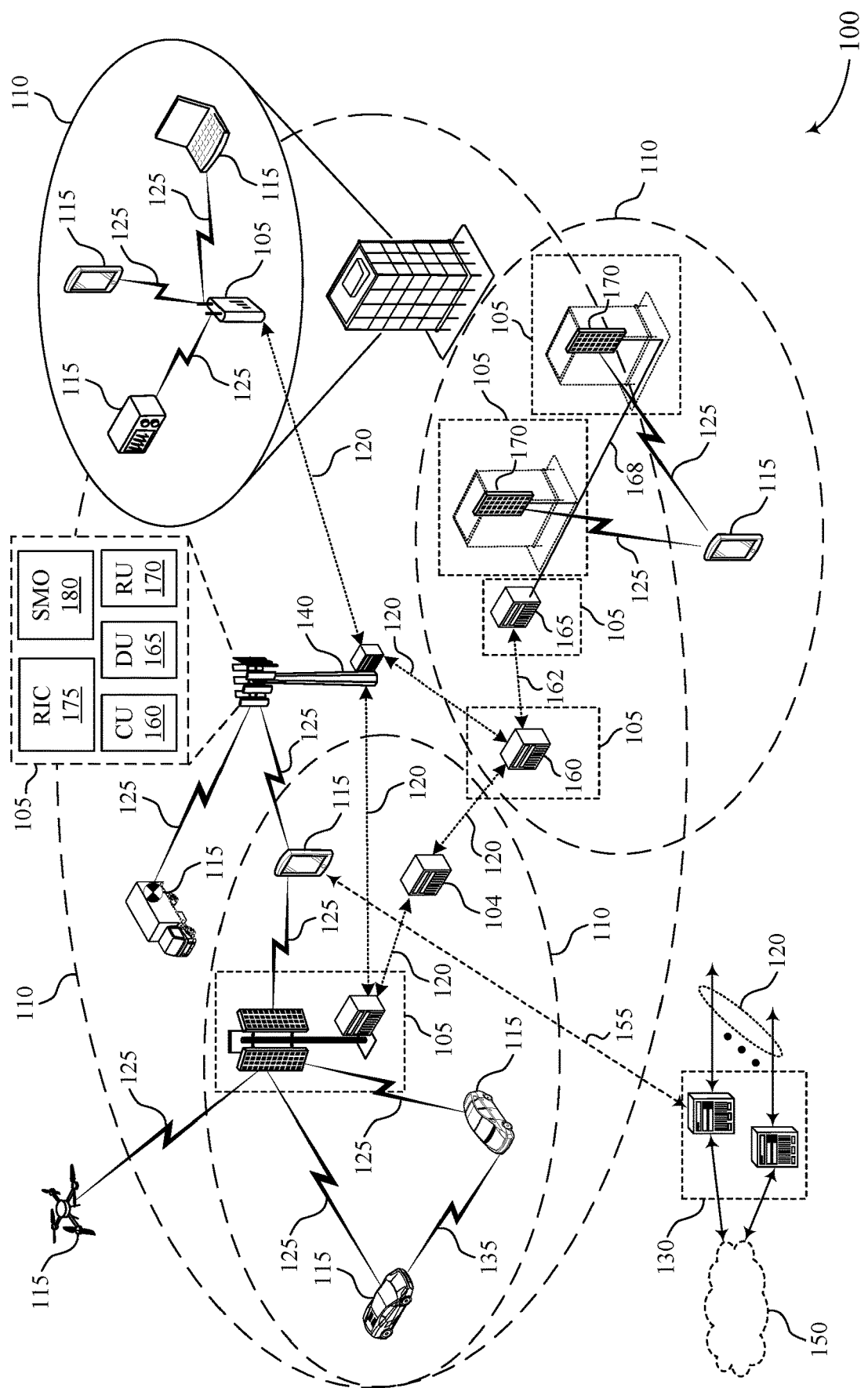
FIG. 1 illustrates an example of a wireless communications system that supports demodulation reference signal (DMRS) configuration for uplink messages in accordance with one or more aspects of the present disclosure.

In some examples of wireless communications, one or more wireless devices (e.g., a user equipment (UE)) may contend for access for a channel with a network entity. As such, each of the one or more UEs may operate in accordance with a random access channel (RACH) procedure (e.g., a 2-step or 4-step RACH procedure). For example, a first UE may transmit a first message (e.g., Msg-A) to the network entity that includes a physical RACH (PRACH) preamble for identification of the UE and uplink data transmitted over a physical uplink shared channel (PUSCH) occasion. In some examples, the PRACH preamble may be mapped to a set of time and frequency resources and demodulation reference signal (DMRS) ports, where the DMRS ports may be used by the network entity for channel estimation of the associated PUSCH. In some cases, however, multiplexing for multiple UEs contending for channel access may result in DMRS port leakage resulting in asynchronous transmissions. As such, it may be advantageous for the network entity to perform channel estimation for a PUSCH with reduced DMRS or without the use of DMRS.

The network entity and UE may decrease DMRS port leakage by operating in accordance with techniques for a DMRS configuration for uplink messages as described herein. In some implementations, the network entity may configure the UE to perform a non-coherent PUSCH transmission using Reed-Muller (RM) coding techniques. As such, the UE may generate an encoded signal in accordance with a configured RM code and transmit the encoded signal to the network entity. In some cases, the encoded signal may not include DMRS. On the decoding side at the network, the network entity may use non-coherent decoding on the encoded signals from one or more UEs in accordance with a multi-user decoding algorithm in which the network entity may decode data and perform channel estimation for each UE based on the RM code. The network entity may repeat iterations until each UE is correctly decoded or there is no improvement in decoding.

Additionally, or alternatively, the network entity may perform channel estimation for a PUSCH using the associated PRACH portion of the PUSCH. In some implementations, the network entity may configure a UE with a DMRS configuration, such as with respect to a bandwidth that is spanned by PRACH. For example, the UE may be configured to use a full DMRS (e.g., DMRS spanning the full PRACH bandwidth), a partial DMRS (e.g., DRMS included across a subset of the PRACH bandwidth), or no DMRS (e.g., DMRS not included in any of the PRACH bandwidth) such as when transmitting first message (e.g., Msg-A) in a PRACH procedure. In examples where the UE is configured to not transmit DMRS, the network entity may perform channel estimation from the PRACH preamble and extrapolate channel coefficients to use for resource elements of the associated PUSCH. In some examples, the network entity may configure the UE to apply a comb structure when transmitting the PRACH preamble (without DMRS). In some examples, the network entity may configure the UE to transmit DMRS in frequency ranges not covered by the PRACH. In some examples, the network entity may configure the UE to transmit DMRS in symbols at the end of a slot and after transmission of the PUSCH. Accordingly, based on the configuration, the network entity may receive an uplink message (e.g., Msg-A, for example), and derive channel estimation of a PUSCH using a PRACH, or a combination of PRACH and DMRS.

Aspects of the disclosure are initially described in the context of wireless communications systems. Aspects of the disclosure are further illustrated by and described with reference to a multi-user decoding algorithm and uplink message configurations. Aspects of the disclosure are further illustrated by and described with reference to apparatus diagrams, system diagrams, and flowcharts that relate to DMRS configuration for uplink messages.

FIG. 1 illustrates an example of a wireless communications system 100 that supports DMRS configuration for uplink messages in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support DMRS configuration for uplink messages as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In some examples of wireless communication system 100, one or more wireless devices (e.g., UEs 115) may contend for access for a channel with a network entity 105. As such, each of the one or more UEs 115 may operate in accordance with a RACH procedure. For example, a first UE 115 may transmit a first message to the network entity 105 that includes a PRACH preamble for identification of the UE 115 and uplink data transmitted over a PUSCH occasion. In some examples, the PRACH preamble may be mapped to a set of time and frequency resources and DMRS ports, where the DMRS ports may be used by the network entity 105 for channel estimation of the associated PUSCH.

Techniques for performing channel estimation may be improved. For example, the channel estimation techniques described herein may allow a device (e.g., a UE 115, a network entity 105) to perform channel estimation based on parameters other than DRMS (e.g., a RM code, PRACH). In some cases, the techniques described herein may allow for DMRS-less channel estimation. In some implementations, the network entity 105 may configure the UE 115 to perform a non-coherent PUSCH transmission using RM coding techniques. For example, the UE 115 may generate an encoded signal in accordance with a configured RM code and transmit the encoded signal to the network entity 105. On the decoding side at the network, the network entity 105 may use non-coherent decoding on one or more encoded signals from multiple UEs 115 in accordance with a multi-user decoding algorithm in which the network entity 105 may decode data and perform channel estimation for each UE 115 based on the RM code associated with the transmission. The network entity 105 may repeat iterations until each UE 115 is correctly decoded or there is no improvement in decoding.

Additionally, or alternatively, the network entity 105 may perform channel estimation for a PUSCH using the associated PRACH portion of the PUSCH. For example, the network entity 105 may configure a UE 115 to include full DMRS, partial DMRS, or no DMRS in the uplink message (e.g., Msg-A). In examples where the UE 115 is configured to not transmit DMRS, the network entity 105 may perform channel estimation from the PRACH preamble and extrapolate channel coefficients to use for resource elements of the associated PUSCH. In some examples, the network entity 105 may configure the UE 115 to apply a comb structure when transmitting the PRACH preamble (as illustrated with reference to FIG. 5). In some examples, the network entity 105 may configure the UE 115 to transmit DMRS in frequency ranges not covered by the PRACH (as illustrated with reference to FIG. 6). In some examples, the network entity 105 may configure the UE 115 to transmit DMRS in symbols at the end of a slot and after transmission of the PUSCH (as illustrated with reference to FIG. 8). Accordingly, based on the configuration, the network entity 105 may receive an uplink message and derive channel estimation of a PUSCH using a PRACH, or a combination of PRACH and DMRS.

Figure 2:
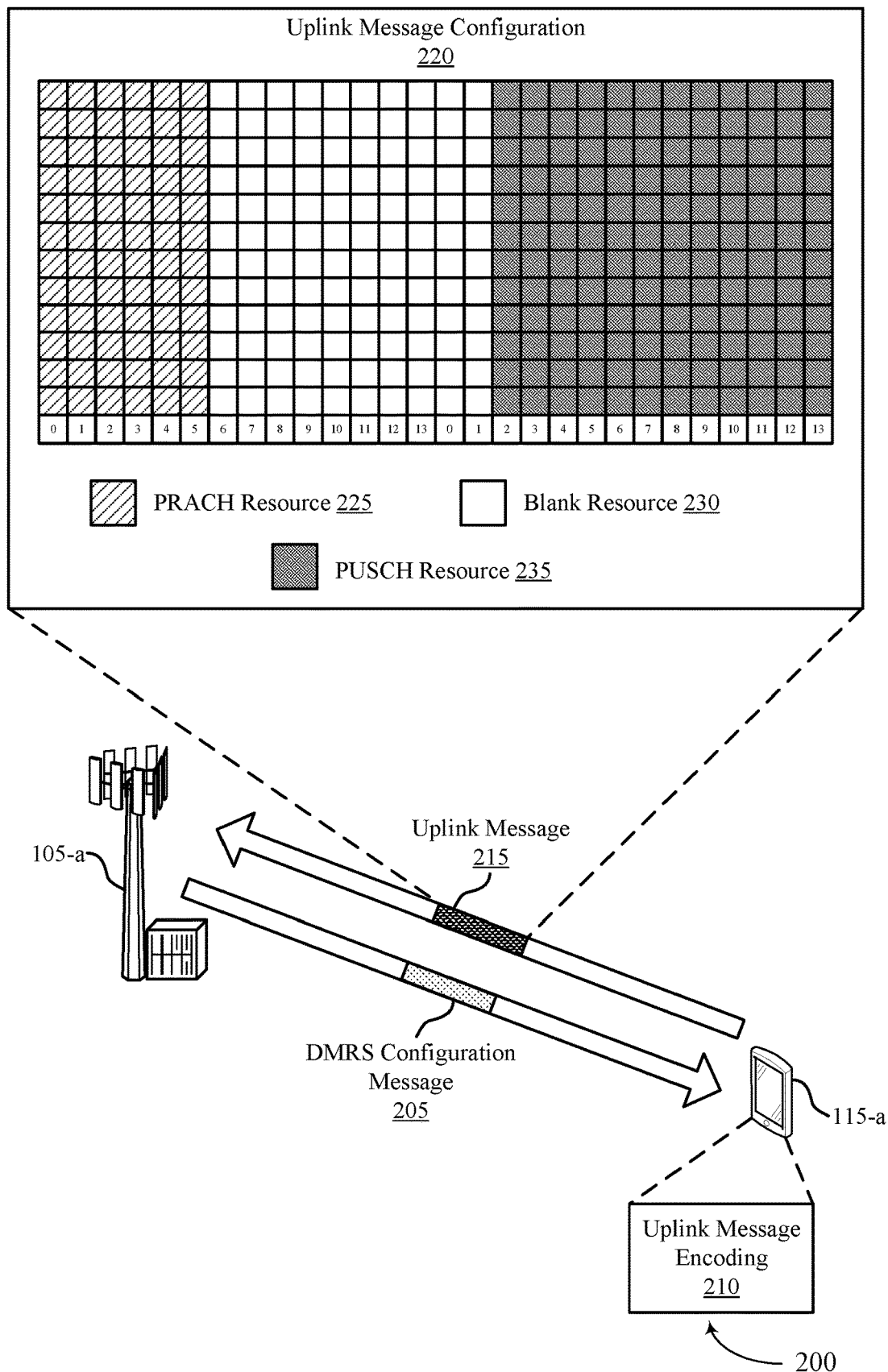
FIG. 2 illustrates an example of a wireless communications system that supports DMRS configuration for uplink messages in accordance with one or more aspects of the present disclosure.

FIG. 2 illustrates an example of a wireless communications system 200 that supports DMRS configuration for uplink messages in accordance with one or more aspects of the present disclosure. In some examples, wireless communications system 200 may implement one or more aspects of wireless communications system 100. For instance, a UE 115a and a network entity 105-a may be respective examples of a UE 115 and a network entity 105, with reference to FIG. 1. While examples are discussed herein, any number of devices and device types may be used to accomplish implementations described in the present disclosure. Wireless communications system 200 may support control signaling between the UE 115-a and the network entity 105-a that indicates for the UE 115-a to refrain from including DMRS in at least a first portion of an uplink message 215 based on receiving a DMRS configuration message 205.

In some examples of wireless communications system 200, the UE 115-a may contend for access for a channel with the network entity 105-a. As such, the UE 115-a may operate in accordance with a RACH procedure (e.g., a 2-step RACH procedure, 4-step RACH, among other examples). In an example of a 2-step RACH procedure, the UE 115-a may transmit to the network entity 105-a, a first message of a RACH procedure (e.g., Msg-A) that may include a PRACH preamble for identification of the UE 115-a and uplink data transmitted over a PUSCH occasion. In some examples, the UE 115-a may select a PRACH preamble from a set of PRACH preambles configured by the network and transmit the PRACH preamble during a RACH occasion. The UE 115-a may select the PRACH preamble randomly, such as from a set of 64 preambles. Additionally, or alternatively, the PRACH preamble may be mapped to a set of time and frequency resources and DMRS ports. In some examples, the DMRS ports may be used by the network entity 105-a for channel estimation of the associated PUSCH transmission.

In some cases, however, multiplexing for multiple UEs 115 contending for channel access may result in an increased channel estimation complexity at the network entity 105-a. For example, the network may support a number of orthogonal DMRS ports (e.g., 12 orthogonal DMRS ports), where the finite number of DMRS ports may result in a bottleneck as the number of multiplexed UEs 115 increases. In some examples, the bottleneck associated with the DMRS ports may result in DMRS port shifting, in which the DMRS ports are no longer orthogonal (e.g., leakage between DMRS ports). In some instances, DMRS port leakage may result in asynchronous transmissions for each UE 115 which may result in a loss of timing advance (TA) information for each respective PUSCH transmission. Additionally, or alternatively, the use of DMRS may increase signaling overhead of the wireless communications system 200. As such, it may be advantageous for the network entity 105-a to perform channel estimation for a PUSCH with reduced DMRS occasions.

The network entity 105-a may perform channel estimation without the use of DMRS or with reduced DMRS according to the techniques described herein. For example, the network entity 105-a may transmit a DMRS configuration message 205 to the UE 115-a, which may indicate for the UE 115-a to encode an uplink message 215 such that at least a first portion (e.g., a time range, a frequency range, or a combination thereof) of the uplink message 215 may not include DMRS. For example, the UE 115-a may generate the uplink message 215 in accordance with uplink message configuration 220 as illustrated in FIG. 2. In such examples, the uplink message configuration 220 may include a set of PRACH resources 225 during a first set of time and frequency resources, a set of PUSCH resources 235 during a second set of time and frequency resources, and a set of blank resources 230 between the PRACH resources 225 and the PUSCH resources 235. As such, the uplink message configuration 220 may refrain from including DMRS resources during at least a first portion of the uplink message 215. Further examples of various uplink message configurations 220 are described herein, including with reference to FIGS. 4 through 8.

In some implementations, the DMRS configuration message 205 may indicate for the UE 115-*a* to perform a non-coherent PUSCH transmission in accordance with RM coding techniques to allow the network entity 105-*a* to perform channel estimation without DMRS or with reduced DMRS occasions. In such implementations, the DMRS configuration message 205 may include one or more fields indicating for the UE 115-*a* to refrain from including DMRS in the uplink message 215. For example, the DMRS configuration message 205 may be an example of a control message (e.g., an RRC message, a medium access control-control element (MAC-CE) message, a downlink control information (DCI) message) that configures DMRS for use by the UE 115-*a* in a RACH procedure (e.g., MsgA-DMRS-Config-r16) which may include a field indicating the length of the associated DMRS (e.g., msgA-MaxLength-r16). As such, the network entity 105-*a* may set the length of the associated DMRS to a value '0' to indicate for the UE 115-*a* to not use DMRS.

Additionally, or alternatively, the DMRS configuration message 205 may be an example of a control message that configures resources for a PUSCH at the UE 115-*a* (e.g., MsgA-PUSCH-Resource-r16) that includes a field indicating a number of DMRSs to use in the PUSCH (e.g., nrofDMRS-Sequences-r16). As such, the network entity 105-*a* may set the number of DMRSs to a value '0' to indicate for the UE 115-*a* to not use DMRS in the uplink message 215. In some examples, the DMRS configuration message 205 may also include a field indicating a low-density parity-check (LDPC) code and/or an RM code for the UE 115-*a* to use for encoding the uplink message 215 (e.g., msgA-code-r16 ENUMERATED {LDPC, RAI}). As such, the UE 115-*a* may perform uplink message encoding 210 in accordance with the LDPC code and/or the RM code indicated in the DMRS configuration message 205.

In some examples, the UE 115-*a* may select a PRACH preamble to include in the uplink message 215 based on the DMRS configuration message 205. The UE 115-*a* may also generate a scrambling ID associated with the UE 115-*a* based on the PRACH preamble, based on control signaling indicating the scrambling ID (e.g., RRC signaling), or both. In some examples, the UE 115-*a* may perform the uplink message encoding 210 based on the scrambling ID and transmit the encoded uplink message 215 to the network entity 105-*a*. As such, the network entity 105-*a* may receive the encoded uplink message 215 and use non-coherent decoding on scrambled signals from multiple UEs 115 in accordance with a multi-user decoding algorithm in which the network entity 105-*a* concurrently decodes data and performs channel estimation for a single UE 115 at a time based on the RM code associated with the transmission. The network entity 105-*a* may repeat iterations of the multi-user decoding algorithm until all UEs 115 are correctly decoded or there is no improvement in decoding. Further discussion of the multi-user decoding algorithm at the network entity 105-*a* in accordance with a non-coherent PUSCH are described herein, including with reference to FIG. 3.

In some cases, wireless communications system 200 may utilize a non-coherent PUSCH for the uplink message 215 for smaller data payloads (e.g., data less than 200 bits). In some examples, the non-coherent PUSCH may be applied to PUSCH types other than a RACH PUSCH (e.g., a configured grant PUSCH or a grant-based PUSCH). In examples of the non-coherent PUSCH, the PUSCH resources 235 may be independent from the PRACH resources 225.

In some examples, the UE 115-*a* may select a PRACH preamble to include in the uplink message 215 based on the DMRS configuration message 205. The UE 115-*a* may also generate a scrambling ID associated with the UE 115-*a* based on the PRACH preamble, based on control signaling indicating the scrambling ID (e.g., RRC signaling), or both. In some examples, the UE 115-*a* may perform the uplink message encoding 210 based on the scrambling ID and transmit the encoded uplink message 215 to the network entity 105-*a*. As such, the network entity 105-*a* may receive the encoded uplink message 215 and use non-coherent decoding on scrambled signals from multiple UEs 115 in accordance with a multi-user decoding algorithm in which the network entity 105-*a* concurrently decodes data and performs channel estimation for a single UE 115 at a time based on the RM code associated with the transmission. The network entity 105-*a* may repeat iterations of the multi-user decoding algorithm until all UEs 115 are correctly decoded or there is no improvement in decoding. Further discussion of the multi-user decoding algorithm at the network entity 105-*a* in accordance with a non-coherent PUSCH are described herein, including with reference to FIG. 3.

In some cases, wireless communications system 200 may utilize a non-coherent PUSCH for the uplink message 215 for smaller data payloads (e.g., data less than 200 bits). In some examples, the non-coherent PUSCH may be applied to PUSCH types other than a RACH PUSCH (e.g., a configured grant PUSCH or a grant-based PUSCH). In examples of the non-coherent PUSCH, the PUSCH resources 235 may be independent from the PRACH resources 225.

Additionally or alternatively to implementing a non-coherent PUSCH transmission, the network entity 105-*a* may perform channel estimation for PUSCH resources 235 using corresponding PRACH resources 225 in order to perform channel estimation without the use of DMRS or with reduced DMRS occasions. As such, the DMRS configuration message 205 may indicate for the UE 115-*a* to use a full DMRS, a partial DMRS, or no DMRS when transmitting the uplink message 215. In such implementations, the DMRS configuration message 205 may be an example of a control message (e.g., an RRC message) that configures DMRS for use by the UE 115-*a* in a RACH procedure (e.g., MsgA-DMRS-Config-r16) which may include a field indicating an associated DMRS version (e.g., MsgA-PUSCH-DMRS-version ENUMERATED {full, partial, none}). For example, the DMRS configuration message 205 may indicate whether UE 115-*a* is to transmit DMRS on a bandwidth that is covered by PRACH, where the UE 115-*a* may be configured to transmit DMRS over a consecutive frequency resources that encompass the PUSCH, over frequency resources that partially encompass the PUSCH, or to refrain from transmitting DMRS.

In examples where the UE 115-*a* is configured to not transmit DMRS, the network entity 105-*a* may perform channel estimation from the PRACH preamble (e.g., the PRACH resources 225) and extrapolate channel coefficients to use for the PUSCH resources 235. Further discussion where the UE 115-*a* is configured to not transmit DMRS is described herein, including with reference to FIG. 4.

In some examples, the network entity 105-a may configure the UE 115-a to apply a comb structure to the uplink message configuration 220 for the PRACH resources 225. Further discussion of uplink message 215 transmission using a comb structure are described herein, including with reference to FIG. 5.

In some examples, the network entity 105-a may configure the UE 115-a to transmit a partial DMRS in frequency resources not covered by the PRACH resources 225. Further discussion of partial DMRS configurations are described herein, including with reference to FIG. 6.

In some examples, the network entity 105-a may configure a first UE 115 and a second UE 115 to use different DMRS configurations (e.g., transmitting respective DMRS configuration messages 205 to each UE 115). Further discussion of indicating different DMRS configurations to respective UEs 115 is described herein, including with reference to FIG. 7.

In some examples, the network entity 105-a may configure the UE 115-a to transmit a full DMRS at the end of a slot and after transmission of the PUSCH resources 235. Further discussion of full DMRS configurations are described herein, including with reference to FIG. 8.

The wireless communications system 200 may utilize a PRACH based channel estimation for low mobility internet of things (IoT) applications, for cases where the PUSCH bandwidth is included in the PRACH bandwidth, for cases where the time gap between the PRACH resources 225 and PUSCH resources 235 are below a configured threshold, or a combination thereof.

Figure 3:
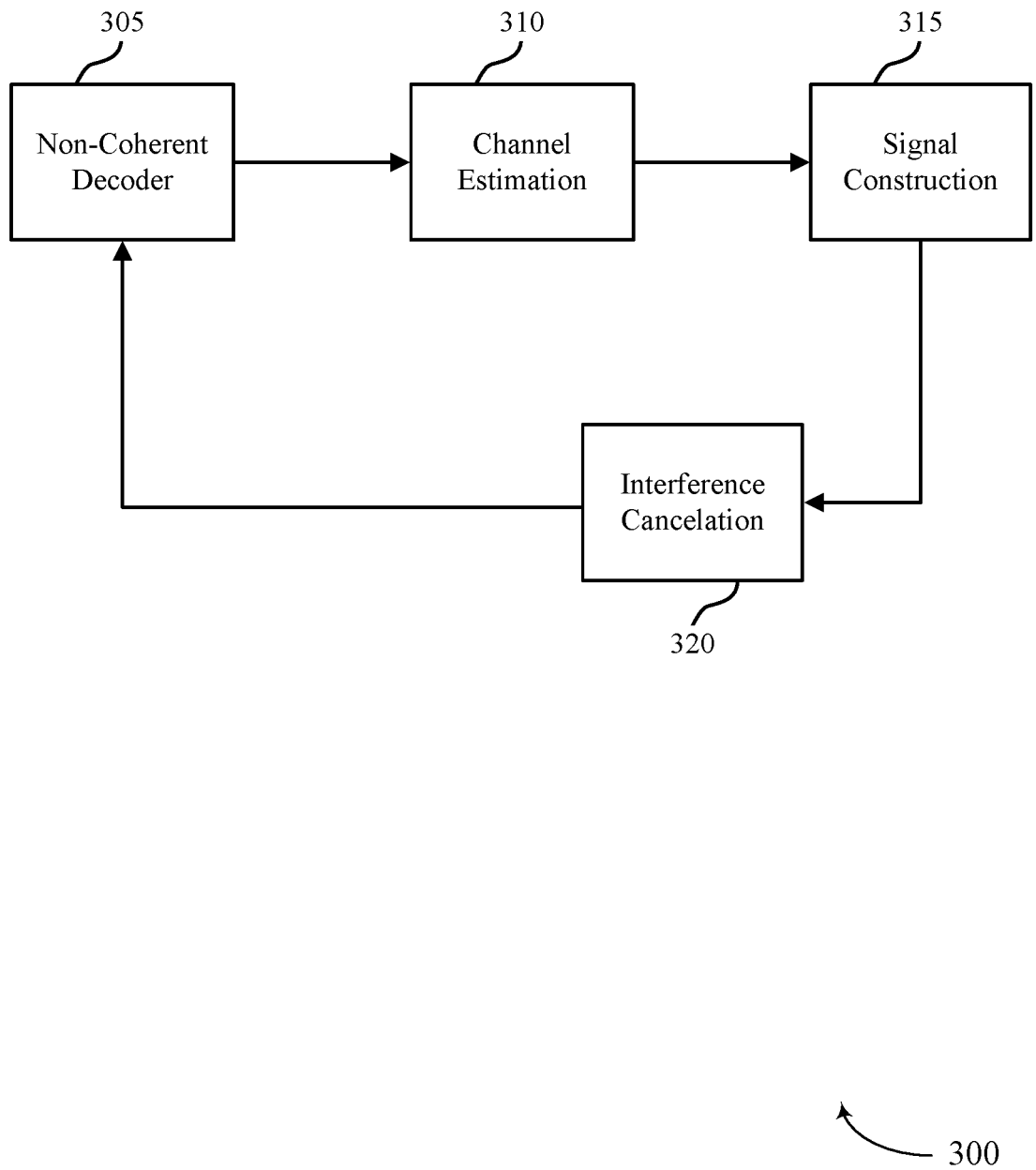
FIG. 3 illustrates an example of a multi-user decoding algorithm that supports DMRS configuration for uplink messages in accordance with one or more aspects of the present disclosure.

FIG. 3 illustrates an example of a multi-user decoding algorithm 300 that supports DMRS configuration for uplink messages in accordance with one or more aspects of the present disclosure. In some examples, the multi-user decoding algorithm 300 may implement one or more aspects of wireless communications system 100 and wireless communications system 200. For instance, multi-user decoding algorithm 300 may be implemented by a network entity 105, with reference to FIG. 1. Additionally, or alternatively, the multi-user decoding algorithm 300 may be an example of the multi-user decoding algorithm used by network entity 105-a, with reference to FIG. 2. The multi-user decoding algorithm 300 may support decoding multiplexed signaling from multiple UEs 115 contending for access to channels associated with the network entity 105, where the multiplexed signaling includes non-coherent PUSCH transmissions.

In some cases, wireless devices may perform coherent communications in which a transmitting device may include pilot symbols (e.g., DMRS symbols) in a data transmission. A receiving device may perform channel estimation using the pilot symbols and extrapolate the channel estimation to the data symbols. The receiving device may then demodulate and decode the data symbols based on the extrapolated channel estimation. In some other cases, wireless devices may perform non-coherent communications in which a transmitting device does not include pilot symbols in the data transmission. As such, each symbol in the data transmission may be used for data which may improve throughput. However, the receiving device would infer (e.g., demodulate and decode) the data information directly from the received signal without performing channel estimation.

In order to successfully infer the data information without performing channel estimation, channel coherence may be exploited. Namely, the noncoherent communication scheme may exploit the fact that the channel realization for adjacent coded symbols (e.g., either in adjacent time or frequency resources) may be the same or strongly correlated. For example, in differential modulation, information may be modulated on the phase difference between adjacent coded symbols and in sequence-based scheme, information may be modulated jointly on a sequence of symbols. In order to have a high performance at low SNR, the noncoherent communication scheme will exploit as much channel coherence as possible. However, longer channel coherence results in longer memory, and hence increased receiver complexity. The complexity of optimal decoding may be exponential in the channel coherence, and in the payload size. Therefore, the techniques described here exploit the channel coherence, but with much reduced complexity by using RM coding techniques that exploit the differential structure of the code.

RM codes are algebraic codes and an RM codeword can be thought of as a binary polynomial, and hence mathematically, the decoding may include polynomial reconstruction. Specifically, the goal of the decoding is to recover the coefficients of the polynomials that represents a RM codeword. The coefficients of different polynomial orders may be reconstructed at different steps of the decoding procedure, where the main property of the RM code that can be exploited for non-coherent communications is the differential property of RM codes. The differential of an RM code of order r is a RM code of order r−1. For example, a decoding procedure may start with an order r code and may apply the differentials along the direction alpha which may result in an RM code of order r−1. The differential property is beneficial because assuming the channel is the same, the channel coefficient can be removed in order to perform non-coherent coding using r−1.

For example, the network entity 105 may receive a multiplexed uplink message that includes a set of uplink messages (e.g., packets) from a set of different UEs 115. In some examples, each uplink message of the set of uplink messages may be associated with a respective RM code. In some examples, each RM code may be a unique RM code associated with a respective UE 115. For example, as described with reference to FIG. 2, the network entity 105 may transmit a DMRS configuration message 205 to each UE 115 that indicates a respective LDPC code and RM code unique to the receiving UE 115. Additionally, or alternatively, each UE 115 may uniquely determine a respective RM code. In some cases, each UE 115 may signal the RM code to the network entity 105 and/or the network entity 105 may be able to identify each RM code associated with each UE 115. Additionally, or alternatively, the network entity 105 and the set of UEs 115 may determine which wireless communications may use RM coding techniques. For example, the network entity 105 may transmit respective control signals to each of the set of UEs 115 indicating a set of one or more transmissions in which to use RM coding. As such, each of the set of UEs 115 may transmit acknowledgment messages indicating the use of RM coding for the one or more transmissions.

As such, the network entity 105 may utilize the respective RM codes in accordance with the multi-user decoding algorithm 300 to decode each of the set of uplink messages and perform channel estimation of the respective non-coherent PUSCH transmissions. For example, the network entity 105 may have an associated non-coherent decoder 305 that the network entity 105 may use to decode the multiple non-coherent PUSCH transmissions in the set of uplink messages. In some examples, the network entity 105 may decode each of the set of uplink messages separately. For example, the network entity 105 may decode the multiplexed uplink message using a first respective RM code associated with a first UE 115 and a first uplink message. By using the first respective RM code, the network entity 105 may attempt to decode (e.g., descramble) the contents of the first uplink message from the multiplexed uplink message. As such, the network entity 105 may perform a channel estimation 310 on the PUSCH transmission of the first uplink message in accordance with the first respective RM code. In some examples, the network entity 105 may decode an uplink message and perform the channel estimation 310 concurrently. Based on decoding and performing the channel estimation 310, the network entity 105 may perform signal construction 315, to construct the first uplink message independent from the multiplexed uplink message.

As such, the network entity 105 may utilize the respective RM codes in accordance with the multi-user decoding algorithm 300 to decode each of the set of uplink messages and perform channel estimation of the respective non-coherent PUSCH transmissions. For example, the network entity 105 may have an associated non-coherent decoder 305 that the network entity 105 may use to decode the multiple non-coherent PUSCH transmissions in the set of uplink messages. In some examples, the network entity 105 may decode each of the set of uplink messages separately. For example, the network entity 105 may decode the multiplexed uplink message using a first respective RM code associated with a first UE 115 and a first uplink message.

By using the first respective RM code, the network entity 105 may attempt to decode (e.g., descramble) the contents of the first uplink message from the multiplexed uplink message. As such, the network entity 105 may perform a channel estimation 310 on the PUSCH transmission of the first uplink message in accordance with the first respective RM code. In some examples, the network entity 105 may decode an uplink message and perform the channel estimation 310 concurrently. Based on decoding and performing the channel estimation 310, the network entity 105 may perform signal construction 315, to construct the first uplink message independent from the multiplexed uplink message.

In some examples, and as described herein, each RM codeword may be a binary polynomial. As such, the network entity may decode the data associated with the RM codeword based on performing a polynomial reconstruction. For instance, the network entity 105 may recover the coefficients of the polynomials that represent a given RM codeword. The network entity may recover the coefficient of the polynomials by utilizing a differential property of RM coding in which a differential of an RM code of order r may have an order of r−1. As such, the network entity 105 may receive the multiplexed uplink message across a set of receive antennas, and may compute a differential of the multiplexed signal based on how it is received at each of the set of receive antennas. In some examples, the network entity 105 may combine each of the differentials across the set of receive antennas to construct a r−1 projection of tensor (e.g., an algebraic object that describes a multilinear relationship between sets of algebraic objects related to a vector space) associated with the $r^{th}$ order binary polynomial for the RM codeword.

Based on constructing the r−1 projection, the network entity may reconstruct a square tensor from the projections and cancel the contributions of the square tensor from the set of receive antennas. As such, the network entity 105 may compute another set of differentials as another channel output after canceling the contributions of the square tensor. In some examples, the network entity may recursively reconstruct a set of square tensors to obtain the RM codeword and the associated data at the network entity 105 for a given UE 115.

Based on successfully decoding, performing channel estimation 310, and performing signal construction 315 for the first uplink message, the network entity 105 may remove (e.g., cancel) the first uplink message from the multiplexed uplink message. That is, the network entity 105 may remove the first UEs 115 contribution to the overall signal. For example, the network entity 105 may perform interference cancelation 320, in which the network entity 105 cancels the contents of the first uplink message from the received multiplexed uplink message.

Subsequently or concurrently to applying the multi-user decoding algorithm 300 to the first UE 115, the network entity 105 may perform the multi-user decoding algorithm 300 using a second respective RM code to decode, perform channel estimation 310, and perform signal construction 315 for a second uplink message associated with the second respective RM code. In some examples, the network entity 105 may repeat iterations of the multi-user decoding algorithm 300 until each UE 115 associated with the multiplexed uplink message is correctly decoded and/or until algorithm results in no additional improvements of each decoded uplink message from the multiplexed uplink message.

In some implementations, the network entity 105 may simultaneously decode each respective uplink message from the multiplexed uplink message using the multi-user decoding algorithm 300. In such cases, the network entity 105 may utilize each of the respective decoded uplink messages, individually, or as a whole, to determine whether any improvements may be made to one or more of the decoded uplink messages. If improvements may be made, the network entity 105 may apply all or a portion of the multi-user decoding algorithm 300 to a specific one or more uplink messages that can be improved, or to the complete set of uplink messages associated with the multiplexed uplink message.

In some examples, the network entity 105 may refrain from repeating the multi-user decoding algorithm 300 if the network entity 105 identifies no improvement in decoding the multi-user decoding algorithm 300. For instance, one or more parameters associated with decoding the multiplexed uplink message (e.g., time to decode message, power used to decode message, etc.) may satisfy one or more configured thresholds, indicating for the network entity 105 to conclude the multi-user decoding algorithm 300.

Figure 4:
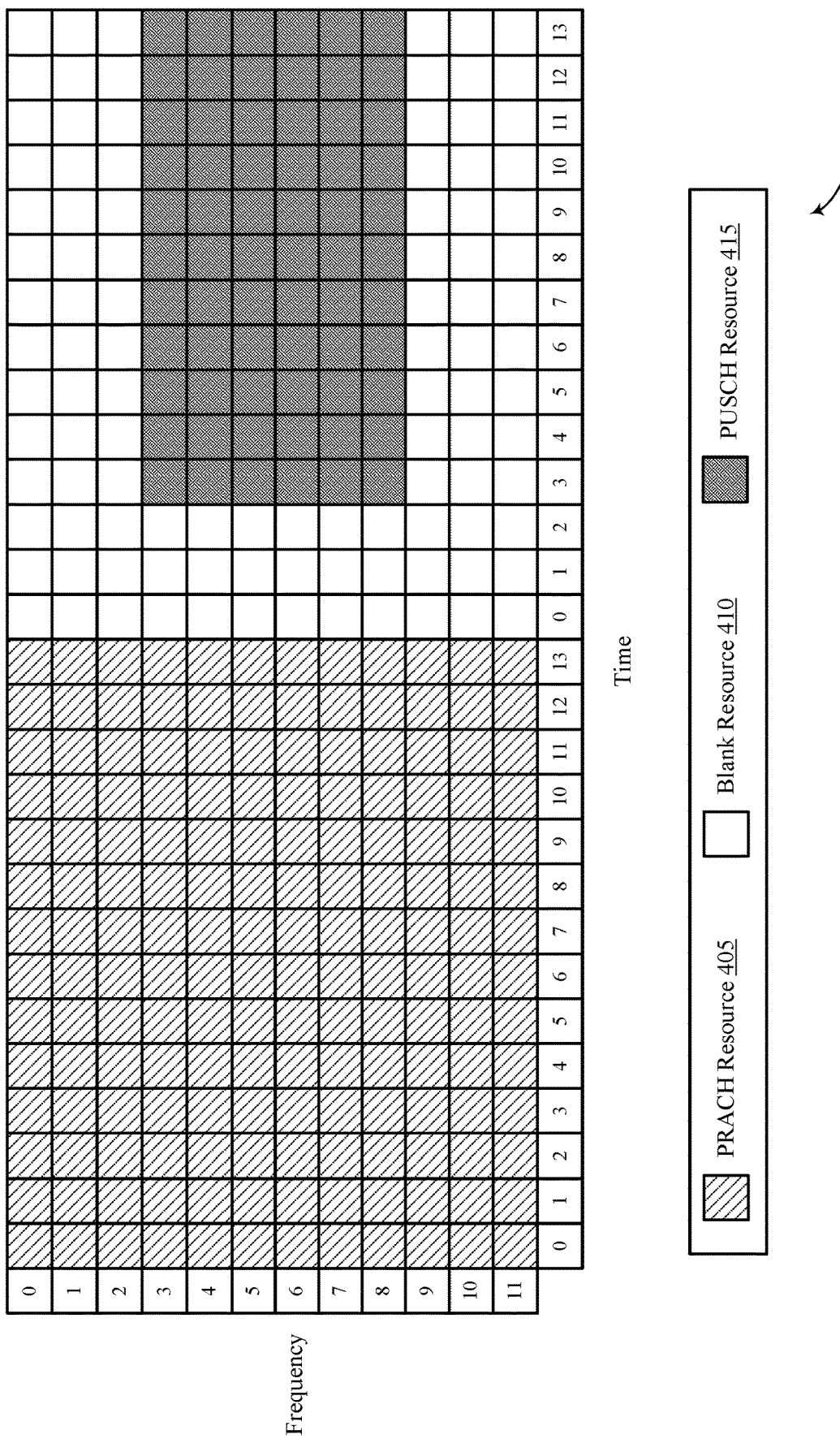
FIGS. 4 through 8 illustrate examples of uplink message configurations that support DMRS configuration for uplink messages in accordance with one or more aspects of the present disclosure.

FIG. 4 illustrates an example of an uplink message configuration 400 that supports DMRS configuration for uplink messages in accordance with one or more aspects of the present disclosure. In some examples, the uplink message configuration 400 may implement one or more aspects of wireless communications system 100 and wireless communications system 200. For instance, uplink message configuration 400 may be an example of the uplink message configuration 220, with reference to FIG. 2. Additionally, or alternatively, the PRACH resources 405, blank resources 410, and PUSCH resources 415 may be respective examples of PRACH resources 225, blank resources 230, and PUSCH resources 235, with reference to FIG. 2. The uplink message configuration 400 may support transmission of an uplink message from a UE 115 to a network entity 105 without DMRS in at least a first portion of the uplink message.

In some examples, the UE 115 may generate the uplink message configuration 400 in accordance with control signaling (e.g., RRC signaling) received from the network entity 105. For example, with reference to FIG. 2, the uplink message configuration 400 may be an example of a configuration generated based on receiving a DMRS configuration message 205 including a field (e.g., parameter) indicating for the UE 115 to not include DMRS (e.g., MsgA-PUSCH-DMRS-version ENUMERATED {none}). Additionally, or alternatively, the uplink message may include a field indicating whether the UE 115 is to transmit DMRS on a frequency range (e.g., bandwidth) that is covered by PRACH resources 405. As such, the UE 115 may generate the uplink message configuration 400 with no DMRS.

As illustrated in FIG. 4, the uplink message configuration 400 includes a set of PRACH resources 405 during a first time range that spans a first frequency range, and may include a set of PUSCH resources 415 during a second time range that spans a second frequency range. In some examples of uplink message configuration 400, the second frequency range associated with the PUSCH resources 415 may be included in the first frequency range associated with the PRACH resource 405 (e.g., PUSCH bandwidths PRACH bandwidth). For example, as illustrated in FIG. 4, the PRACH resources 405 may span 12 resources blocks of the frequency and the PUSCH resources may span 6 resources blocks of the frequency, where the 6 resource blocks may be a subset of the 12 resources blocks. In some implementations, the UE 115 may be configured to generate the uplink message configuration 400 with no DMRS based on the second frequency range being included in the first frequency range (e.g., when the PRACH BW includes the PUSCH BW). In some cases, the UE 115 may be configured to generate the uplink message configuration 400 with no DMRS based on a format of the PRACH resources 405, the PUSCH resources 415, or both. For example, the UE 115 may be configured to generate the uplink message configuration 400 with no DMRS based on being configured to transmit the PRACH resources 405 in accordance with a short format (e.g., 12 resource blocks based on 15 kHz SCS) and/or transmit the PUSCH resources 415 in accordance with a long format (e.g., 6 resource blocks based on 15 kHz SCS).

Additionally, or alternatively, the uplink message configuration 400 may include a small time gap between the PRACH resources 405 and PUSCH resources 415 (e.g., the number of blank resources 410 between the end of PRACH resources 405 and the start of PUSCH resources 415 may be below a configured threshold).

As such, the UE 115 may transmit an uplink message to the network entity 105 in accordance with the uplink message configuration 400. In some examples, the network entity 105 may perform channel estimation on the PUSCH resources 415 based on performing a channel estimation on the PRACH resources 405. For example, the network entity 105 may perform a direct Fourier transform (DFT) based channel estimation (e.g., sounding reference signal (SRS) based channel estimation) for the set of PRACH resources 405. In some examples, the network entity 105 may perform channel estimation of the PRACH resources 405 via Zadoff-Chu sequences. Based on performing the channel estimation on the PRACH preamble, the network entity 105 may extrapolate the channel coefficients to use for the PUSCH resources 415 (e.g., adjust channel coefficients based on a change in frequency and time between the PUSCH resources 415 and the PRACH resources 405) without using DMRS.

Based on the UE 115 not including DMRS in the uplink message, the UE 115 and network entity 105 may benefit from a lower coding rate associated with the uplink message.

Figure 5:
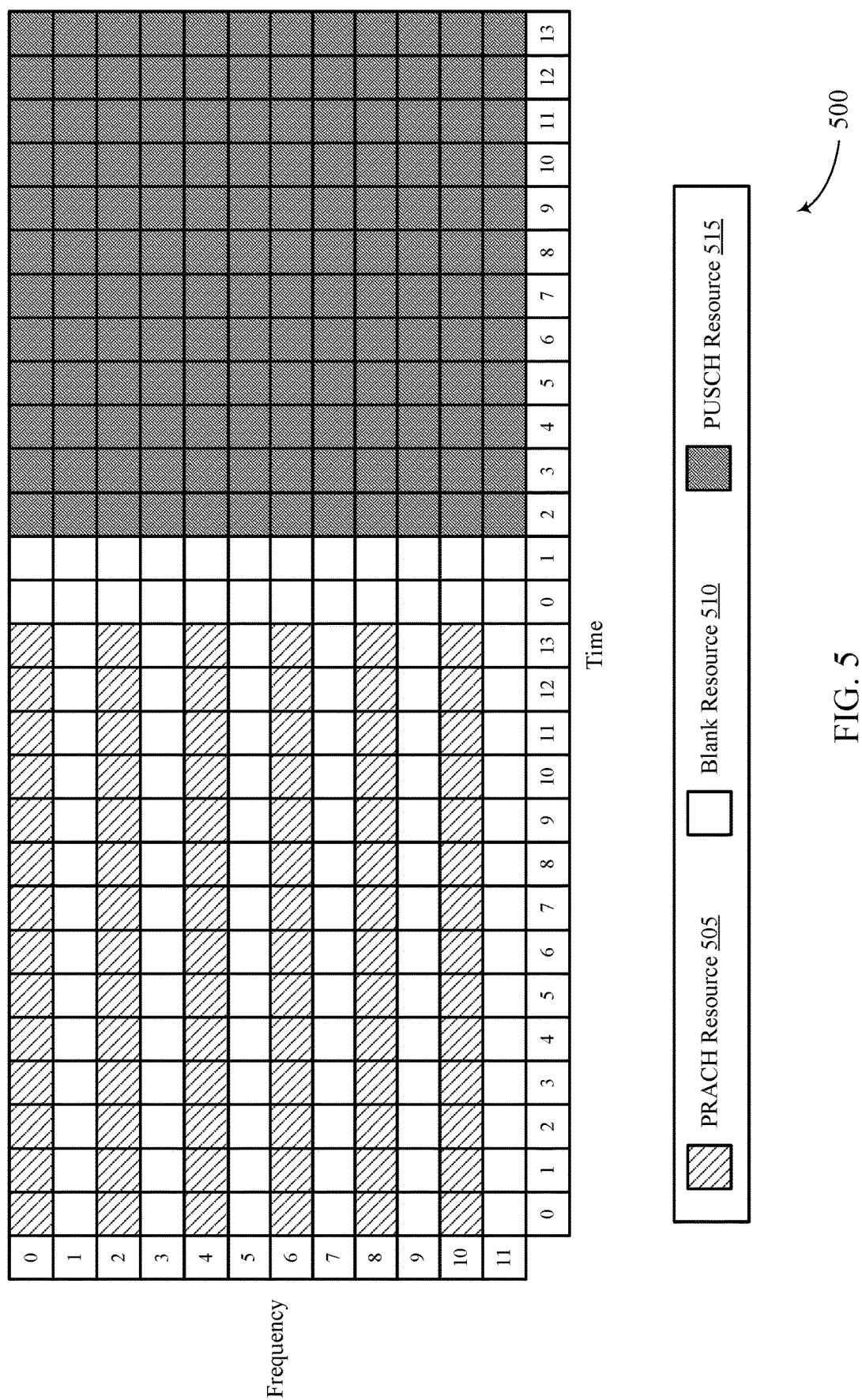

FIG. 5 illustrates an example of an uplink message configuration 500 that supports DMRS configuration for uplink messages in accordance with one or more aspects of the present disclosure. In some examples, the uplink message configuration 500 may implement one or more aspects of wireless communications system 100, wireless communications system 200, and uplink message configuration 400. For instance, uplink message configuration 500 may be an example of the uplink message configuration 220, with reference to FIG. 2. Additionally, or alternatively, the PRACH resources 505, blank resources 510, and PUSCH resources 515 may be respective examples of PRACH resources 225, blank resources 230, and PUSCH resources 235, with reference to FIG. 2. The uplink message configuration 500 may support transmission of an uplink message from a UE 115 to a network entity 105 without DMRS in at least a first portion of the uplink message.

In some examples, the UE 115 may generate the uplink message configuration 500 in accordance with control signaling received from the network entity 105. For example, with reference to FIG. 2, the uplink message configuration 500 may be an example of a configuration generated based on receiving a DMRS configuration message 205 including a field indicating for the UE 115 to not include DMRS (e.g., MsgA-PUSCH-DMRS-version ENUMERATED {none}). As such, the UE 115 may generate the uplink message configuration 500 with no DMRS.

As illustrated in FIG. 5, the uplink message configuration 500 includes a set of PRACH resources 505 during a first time range that spans a first frequency range, and may include a set of PUSCH resources 515 during a second time range that spans a second frequency range. In some examples, the UE 115 may configure PRACH resources 505 of the uplink message configuration 500 in accordance with a comb structure. In some examples, the UE 115 may use a comb structure for the PRACH resource 505 based on receiving an RRC message, or some other control message, indicating the use of a comb (e.g., comb-1/2/3/4). In some cases, the control message may indicate the UE 115 is to implement a comb structure and the UE 115 may select which comb structure to use. In such cases, the UE 115 may transmit to the network entity 105, an indication of which comb structure the UE 115 applied or will apply to the PRACH resources 505. In some cases, the control message may indicate a particular comb structure for the UE 115 to apply to the PRACH resources 405. In some implementations, the UE 115 may be configured to apply a comb structure so that the PRACH resources 505 span a frequency range that includes a frequency range covered by the PUSCH resources 515 (e.g., as depicted in FIG. 5).

By adding a comb structure to PRACH resources 505, the PRACH transmission may cover a larger frequency band. For example, for a sub-carrier spacing (SCS) of 15 kHz, a PRACH transmission filling a total of 12 resource blocks in frequency would span a total of 18 resource blocks in frequency (e.g., including the blank resources 510 in between the PRACH resources 505). In another example, for a SCS of 30 kHz, a PRACH transmission filling a total of 6 resource blocks in frequency would span a total of 12 resource blocks in frequency (e.g., as illustrated in FIG. 5). In an example, each 32 PRACH preamble may be mapped to one half of PUSCH. Therefore, the PUSCH bandwidth may be divided into four, and the comb plus the 32 preambles may be mapped to a quarter. In some examples, using a comb structure for PRACH transmissions may increase a number of UEs 115 that may be multiplexed for a given uplink transmission to the network entity 105.

As described with reference to FIG. 4, the UE 115 may transmit an uplink message to the network entity 105 in accordance with the uplink message configuration 500. In some examples, the network entity 105 may perform channel estimation on the PUSCH resources 515 based on performing a channel estimation on the PRACH resources 505. Based on performing the channel estimation on the PRACH preamble, the network entity 105 may extrapolate the channel coefficients to use for the PUSCH resources 515 (e.g., adjust channel coefficients based on a change in frequency and time between the PUSCH resources 515 and the PRACH resources 505) without using DMRS.

Figure 6:
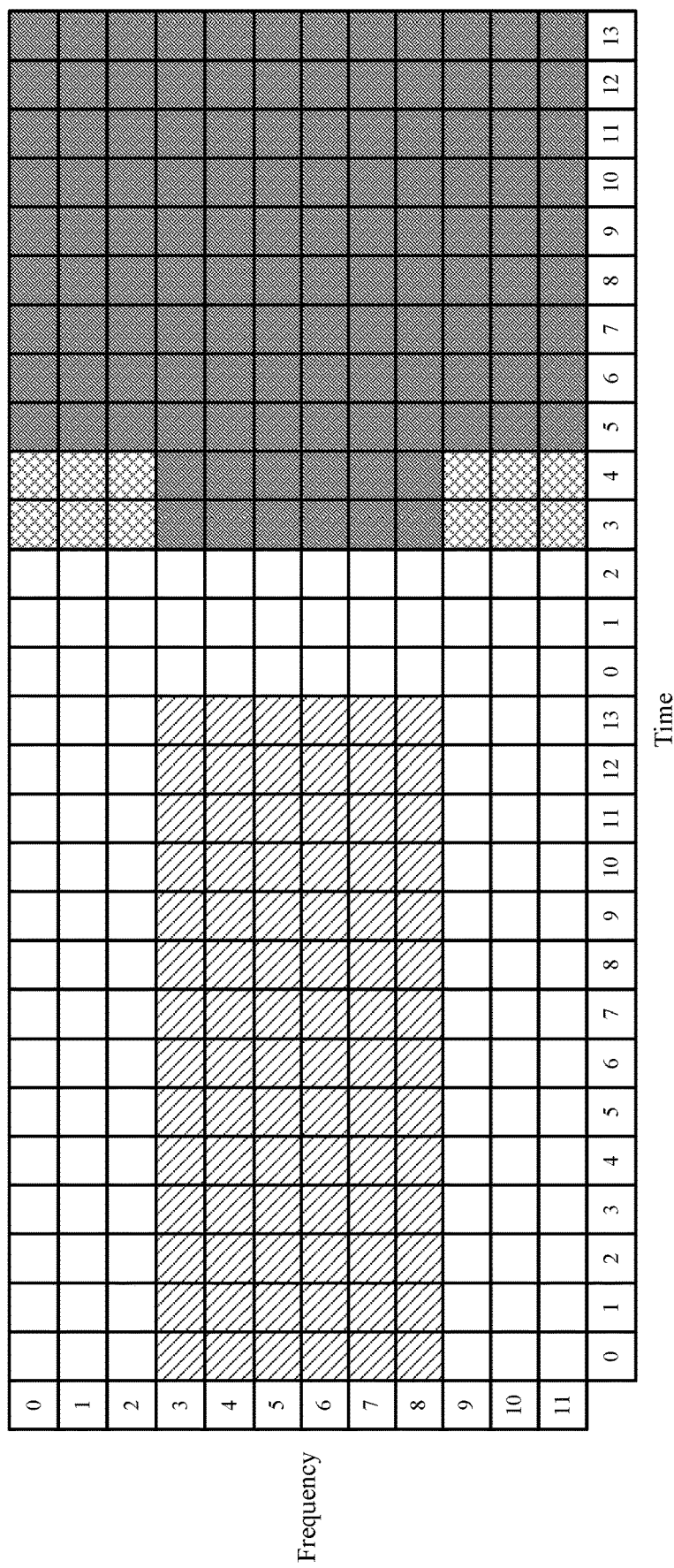
Figure 6:
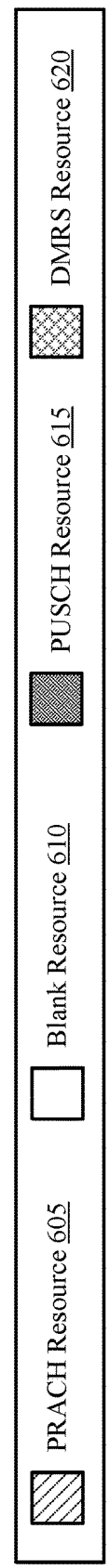

FIG. 6 illustrates an example of an uplink message configuration 600 that supports DMRS configuration for uplink messages in accordance with one or more aspects of the present disclosure. In some examples, the uplink message configuration 600 may implement one or more aspects of wireless communications system 100, wireless communications system 200, and uplink message configuration 400. For instance, uplink message configuration 600 may be an example of the uplink message configuration 220, with reference to FIG. 2. Additionally, or alternatively, the PRACH resources 605, blank resources 610, and PUSCH resources 615 may be respective examples of PRACH resources 225, blank resources 230, and PUSCH resources 235, with reference to FIG. 2. The uplink message configuration 600 may support transmission of an uplink message from a UE 115 to a network entity 105 without DMRS in at least a first portion of the uplink message.

In some examples, the UE 115 may generate the uplink message configuration 600 in accordance with control signaling received from the network entity 105. For example, with reference to FIG. 2, the uplink message configuration 600 may be an example of a configuration generated based on receiving a DMRS configuration message 205 including a field indicating for the UE 115 to not include DMRS in a first portion of the uplink message but may configure the UE 115 to include DMRS in a second portion (e.g., MsgA-PUSCH-DMRS-version ENUMERATED {partial}). As such, the UE 115 may generate the uplink message configuration 600 with a partial DMRS (e.g., DMRS included in a subset of the frequency resources of the uplink message, in a subset of time resources of the uplink message, or a combination thereof).

As illustrated in FIG. 6, the uplink message configuration 600 includes a set of PRACH resources 605 during a first time range that spans a first frequency range, and may include a set of PUSCH resources 615 during a second time range that spans a second frequency range. In some examples, the second time range that includes the set of PUSCH resources 615 may also include a set DMRS resources 620 in accordance with the DMRS configuration message 205 indicating a partial DMRS configuration. In some examples, the DMRS resources 620 of the partial DMRS configuration may span resources over the frequency resources not covered by the PRACH resources 605 (e.g., as illustrated in FIG. 6). In some examples, the UE 115 may generate the uplink message configuration 600 in accordance with the techniques described with reference to FIGS. 4 and 5. For example, the UE 115 may receive an RRC message from the network entity 105 indicating to use a comb structure for the PRACH resources 605 and insert the DMRS resources 620 in the blank frequency resources of the comb structure, where the blank frequency resource may be in a time range associated with the PRACH resources 405, or a time range associated with the PUSCH resources 415, or a combination thereof. For example, the UE 115 may be configured to include DMRS in all or a subset of frequency resources not covered by PRACH and may include the DMRS with the PRACH or the PUSCH. Additionally, or alternatively, the UE 115 may generate the uplink message configuration 600 such that the PUSCH bandwidth $\subseteq$ PRACH bandwidth.

As such, the UE 115 may transmit an uplink message to the network entity 105 in accordance with the uplink message configuration 600. In some examples, the network entity 105 may perform channel estimation on the PUSCH resources 615 based on performing a channel estimation on the PRACH resources 605 in combination with a channel estimation of the DMRS resources 620. For example, as discussed with reference to FIG. 4, the network entity 105 may perform channel estimation of the PRACH resources 605 via Zadoff-Chu sequences and further perform channel estimation of the DMRS resources 620. As such, the network entity 105 may combine the PRACH and DMRS channel estimations and extrapolate channel coefficients to use for the PUSCH resources 615. By combining channel estimation from the partial DMRS and the PRACH, the network entity 105 may benefit from an increase in reliability for performing PUSCH channel estimation.

Figure 7:
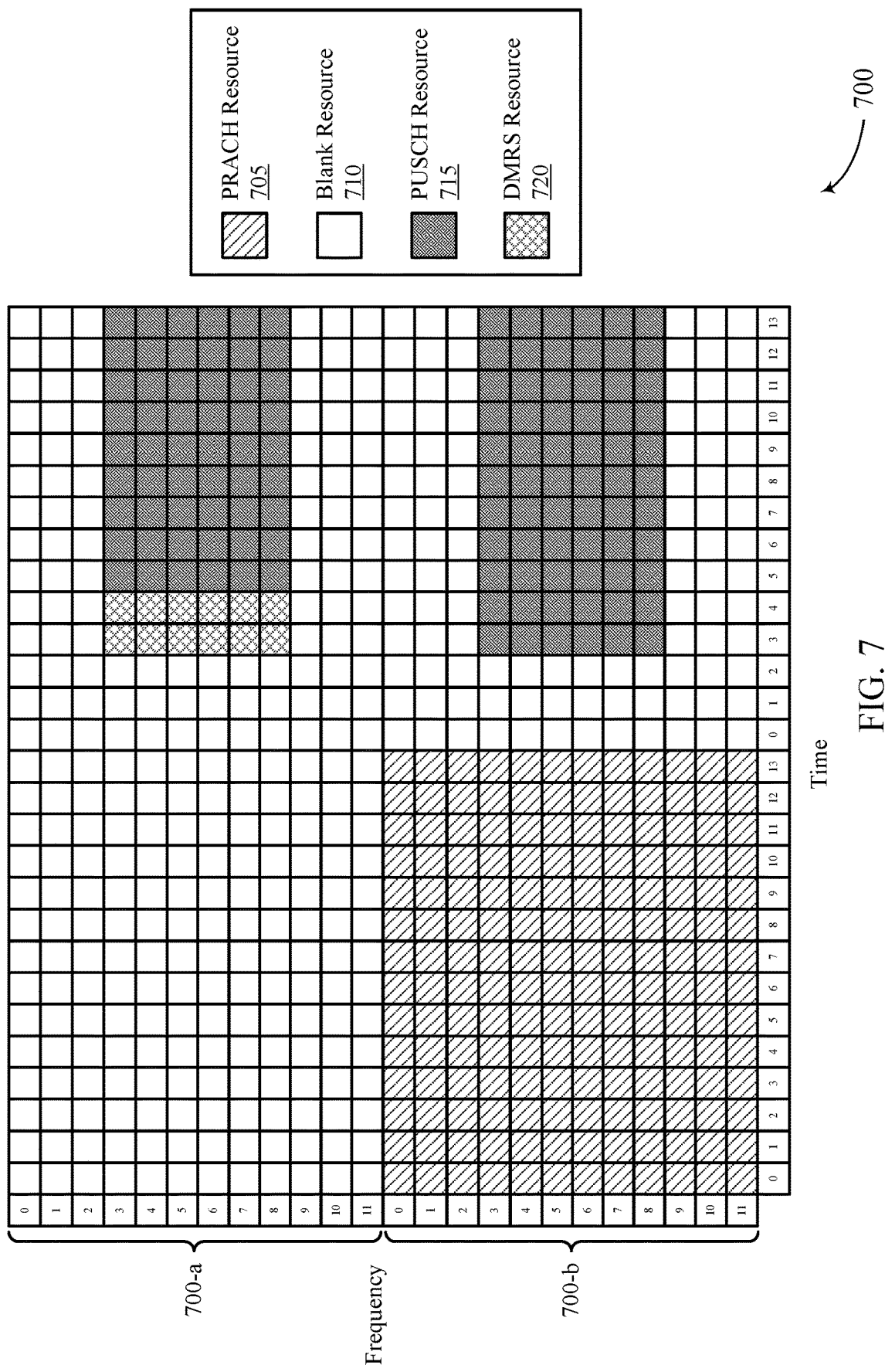

FIG. 7 illustrates an example of uplink message configurations 700 that may include uplink message configurations 700-a and 700-b that support DMRS configuration for uplink messages in accordance with one or more aspects of the present disclosure. In some examples, the uplink message configuration 700 may implement one or more aspects of wireless communications system 100, wireless communications system 200, and uplink message configuration 400. For instance, uplink message configurations 700-a and 700-b may be respective examples of an uplink message configurations 220 for a first UE 115 and a second UE 115, with reference to FIGS. 1 and 2. Additionally, or alternatively, the PRACH resources 705, blank resources 710, and PUSCH resources 715 may be respective examples of PRACH resources 225, blank resources 230, and PUSCH resources 235, with reference to FIG. 2. The uplink message configuration 700 may support transmission to a network entity 105 of respective uplink messages from the first UE 115 and the second UE 115 using different DMRS configurations.

In some examples, the first and second UE 115 may generate the uplink message configurations 700-a and 700-b in accordance with respective control signaling received from the network entity 105. For example, with reference to FIG. 2, the uplink message configuration 700-a may be an example of a configuration generated based on receiving a DMRS configuration message 205 including a field indicating for the first UE 115 to include a full DMRS (e.g., MsgA-PUSCH-DMRS-version ENUMERATED {full}). Additionally, or alternatively, the uplink message configuration 700-b may be an example of a configuration generated based on receiving a DMRS configuration message 205 including a field indicating for the second UE 115 to include a no DMRS (e.g., MsgA-PUSCH-DMRS-version ENUMERATED {none}). While FIG. 7 illustrates two different DMRS configurations for two UEs 115, it is understood that the network entity 105 may configure any number of UEs 115 using any of the different DMRS configurations described herein.

As illustrated in FIG. 7, the uplink message configuration 700-a may not include a set of PRACH resources 705, and instead includes a full DMRS and a PUSCH transmission over a second time range, where the DMRS resources 720 span the same frequency resources as the PUSCH resources 715. Additionally, or alternatively, the uplink message configuration 700-*b* includes a set of PRACH resources 705 during a first time range that spans a first frequency range, and may include a set of PUSCH resources 715 during the second time range that spans a second frequency range. In some examples of uplink message configuration 700-*b*, the second frequency range associated with the PUSCH resources 715 may be included in the first frequency range associated with the PRACH resource 705 (e.g., PUSCH bandwidth ⊆ PRACH bandwidth).

As such, the first UE 115 and the second UE 115 may transmit respective uplink messages to the network entity 105 in accordance with the uplink message configuration 700-*a* and 700-*b*. In some examples, the network entity 105 may perform channel estimation on the PUSCH from the first UE 115 using the received DMRS resources 720. Additionally, or alternatively, the network entity 105 may perform channel estimation on the PUSCH resources 715 from the second UE 115 based on performing a channel estimation on the PRACH resources 705 and extrapolating channel coefficients using techniques described with reference to FIG. 4. By using different DMRS configurations for different UEs 115, the network entity 105 may benefit from being able to use the various PUSCH channel estimation techniques described herein while reducing the total number of DMRS resources 720 used.

Figure 8:
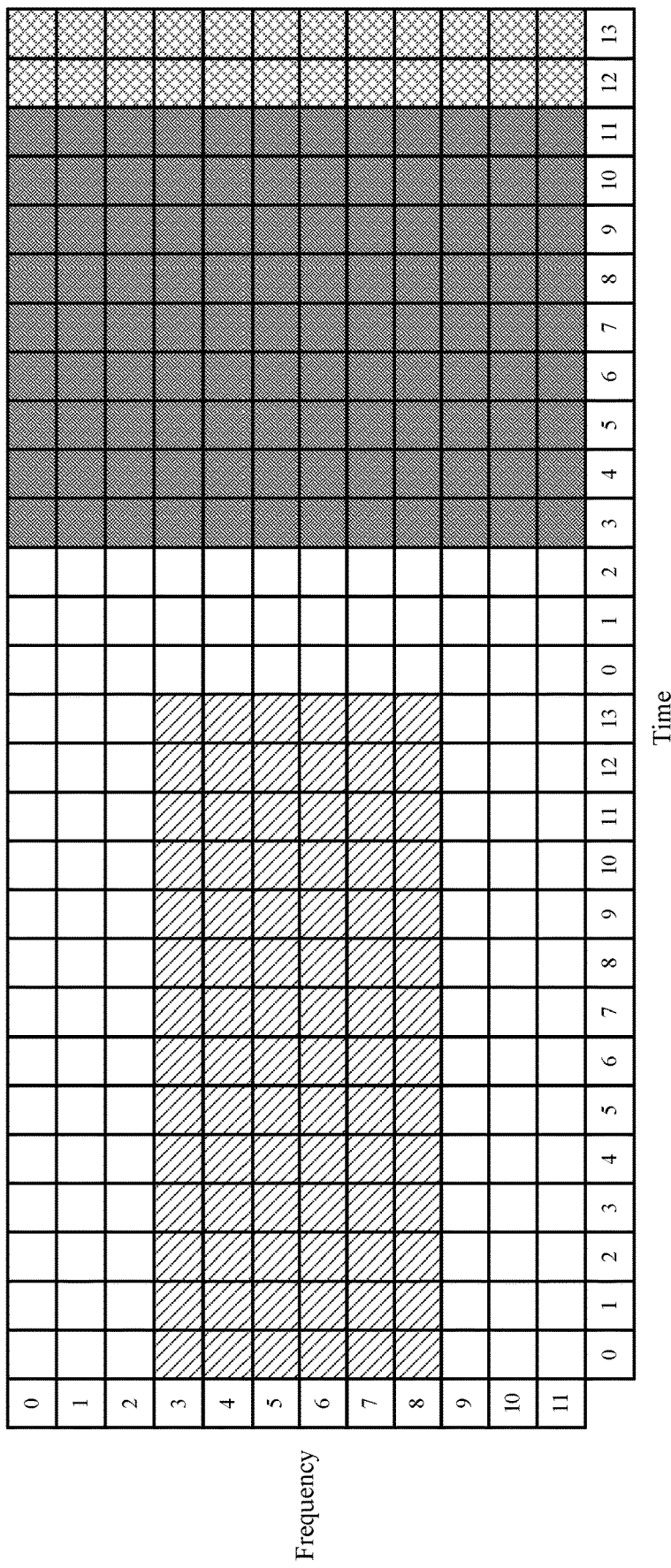

FIG. 8 illustrates an example of an uplink message configuration 800 that supports DMRS configuration for uplink messages in accordance with one or more aspects of the present disclosure. In some examples, the uplink message configuration 800 may implement one or more aspects of wireless communications system 100, wireless communications system 200, and uplink message configuration 400. For instance, uplink message configuration 800 may be an example of the uplink message configuration 220, with reference to FIG. 2. Additionally, or alternatively, the PRACH resources 805, blank resources 810, and PUSCH resources 815 may be respective examples of PRACH resources 225, blank resources 230, and PUSCH resources 235, with reference to FIG. 2. The uplink message configuration 800 may support transmission of an uplink message from a UE 115 to a network entity 105 without DMRS in at least a first portion of the uplink message.

In some examples, the UE 115 may generate the uplink message configuration 800 in accordance with control signaling received from the network entity 105. For example, with reference to FIG. 2, the uplink message configuration 800 may be an example of a configuration generated based on receiving a DMRS configuration message 205 including a field indicating for the UE 115 to include DMRS is a portion of the uplink message (e.g., MsgA-PUSCH-DMRS-version ENUMERATED {full}). As such, the UE 115 may generate the uplink message configuration 800 with a full DMRS (e.g., DMRS that spans a set of frequency resources that include the PUSCH frequency resources). In some examples, the DMRS configuration message 205 may also include a field that indicates for the UE 115 to include the DMRS resources 820 for the full DMRS at the end of a time slot associated with the PUSCH transmission of the uplink message configuration 800. Additionally, or alternatively, the UE 115 may determine or be preconfigured to include the DMRS at the end of the slot. For example, the UE 115 may receive an indication or be configured to refrain from including DMRS with the PRACH and therefore when the UE 115 is configured to include full DMRS with the uplink message, the UE 115 may determine to include the DRMS after the PUSCH.

In some examples, the network entity 105 may indicate for the UE 115 to use incorporate DMRS in cases where Doppler for one or more channels between the UE 115 and network entity 105 are above a configured threshold. In some cases, the UE 115 may be configured to incorporate DMRS at the end of an uplink message in high doppler scenario. For instance, if the UE 115 is operating in a high mobility environment (e.g., on a high-speed train) the UE 115 may experience frequency Doppler shifting for a set of time-frequency resources as the UE 115 moves relative to the network entity 105. For example, channel estimates based on PRACH resources 805 may no longer be completely accurate by the time of the PUSCH resources 815 due to the high doppler. By interpolating the channel coefficients from the PRACH resources 805 before the PUSCH transmission and the channel coefficients of the DMRS resources 820 after the PUSCH transmission, the network entity 105 may identify and mitigate time and frequency resource shifting incurred by Doppler to increase channel estimation of the PUSCH resources 815.

As illustrated in FIG. 8, the uplink message configuration 800 includes a set of PRACH resources 805 during a first time range that spans a first frequency range, and may include a set of PUSCH resources 815 and DMRS resources 820 during a second time range that spans a second frequency range.

As such, the UE 115 may transmit an uplink message to the network entity 105 in accordance with the uplink message configuration 800. In some examples, the network entity 105 may perform channel estimation on the PUSCH resources 815 based on performing a channel estimation on the PRACH resources 805 in combination with a channel estimation of the DMRS resources 820. For example, as discussed with reference to FIG. 4, the network entity 105 may perform channel estimation of the PRACH resources 805 via Zadoff-Chu sequences and further perform channel estimation of the DMRS resources 820. As such, the network entity 105 may combine the PRACH and DMRS channel estimations and interpolate channel coefficients to use for the PUSCH resources 815. By interpolating channel estimation from the partial DMRS and the PRACH, the network entity 105 may benefit from an increase in reliability for performing PUSCH channel estimation.

Figure 9:
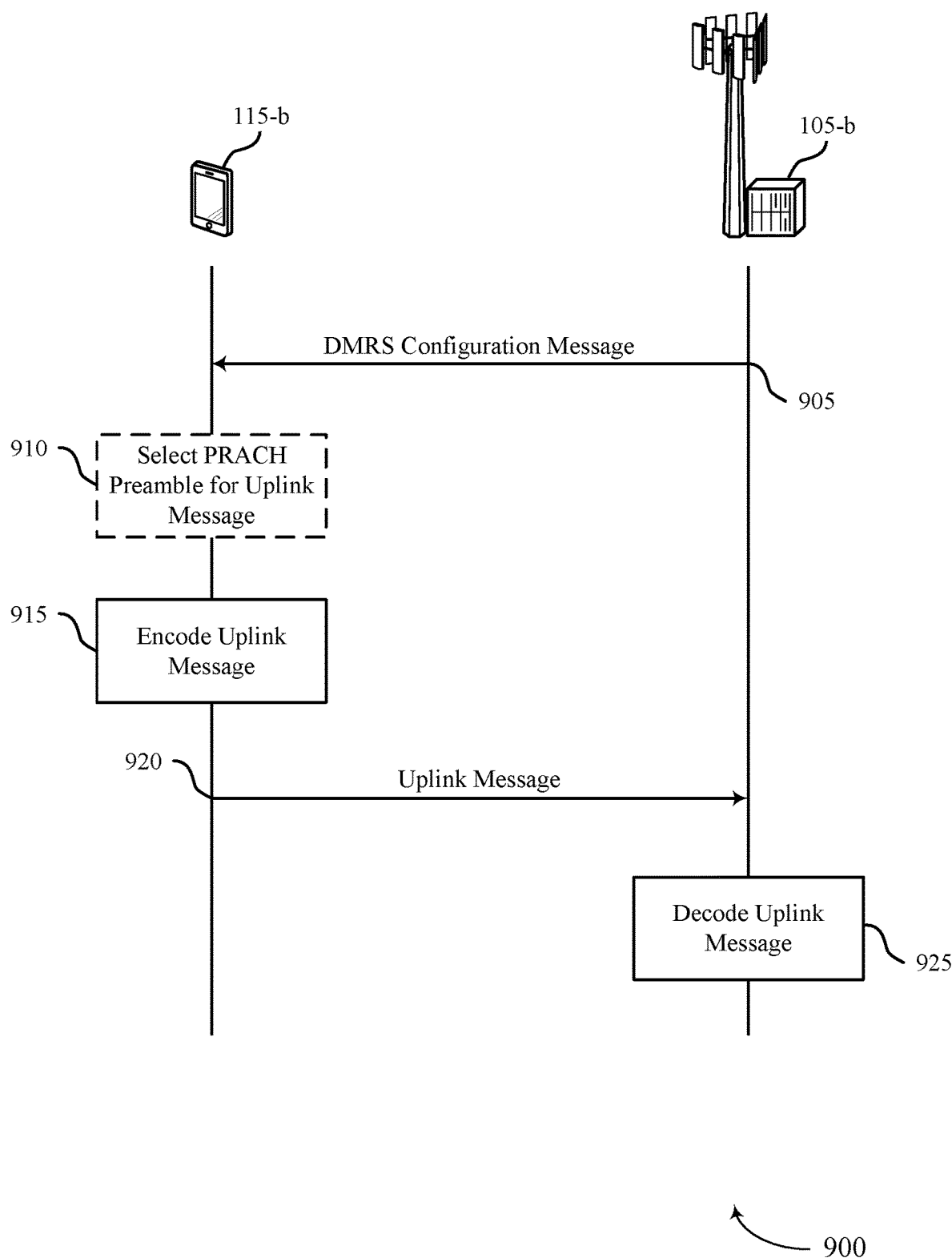
FIG. 9 illustrates an example of a process flow that supports DMRS configuration for uplink messages in accordance with one or more aspects of the present disclosure.

FIG. 9 illustrates an example of a process flow 900 that supports DMRS configuration for uplink messages in accordance with one or more aspects of the present disclosure. In some examples, process flow 900 may implement aspects of wireless communications system 100, wireless communications system 200, multi-user decoding algorithm 300, uplink message configurations 400 through 800, or a combination thereof. Process flow 900 includes a UE 115-*b* and a network entity 105-*b*, which may be respective examples of a UE 115 and a network entity 105, as described with reference to FIGS. 1 and 2. Alternative examples of the following may be implemented, where some steps may be performed in a different order than described or are not performed at all. In some cases, steps may include additional features not mentioned below, or further steps may be added. In addition, while process flow 900 shows processes between a single UE 115 and a single network entity 105, it should be understood that these processes may occur between any number of wireless devices, network devices, and/or network device types.

At 905, the UE 115-*b* may receive from the network entity 105-*b* control signaling indicating a DMRS configuration for an uplink message. In some examples, the control signaling may indicate that the UE 115-*b* may be to refrain from including DMRS in at least a first portion of the uplink message in accordance with the DMRS configuration. In some examples, the UE 115-*b* may receive an RRC message (or some other control message) including the DMRS configuration for the uplink message. In some examples, the DMRS configuration may be based on an amount of Doppler spread at the UE 115-*b*.

In some examples, the DMRS configuration may include a field indicating that the UE 115-*b* may refrain from including the DMRS in the first portion of the uplink message. Additionally, or alternatively, the DMRS configuration includes a field indicating an LDPC code and an RM code for the UE 115-*b* to use for encoding the uplink message. In some cases, the field may be included in an uplink channel resource information element.

In some examples, the UE 115-*b* may receive an indication of whether the UE 115-*b* may include the DMRS in a second portion of the uplink message on a frequency bandwidth that may be covered by a RACH of the uplink message. In some cases, the RACH may be included in the first portion of the uplink message. For instance, the UE 115-*b* may receive a first configuration indicating for the UE 115-*b* to include one or more DMRSs in each frequency resource of the frequency bandwidth covered by the RACH. Additionally, or alternatively, the UE 115-*b* may receive a second configuration indicating to include the one or more DMRSs in a subset of frequency resources of the frequency bandwidth covered by the RACH. Additionally, or alternatively, the UE 115-*b* may receive a third configuration indicating the UE 115-*b* to refrain from including DMRSs in the second portion of the uplink message.

In some instances, the UE 115-*b* may receive an indication of a PRACH comb pattern to apply to the first portion of the uplink message.

In some examples, at 910, the UE 115-*b* may select a PRACH preamble to include in the uplink message. Additionally, or alternatively, the UE 115-*b* may generate a scrambling ID associated with the UE 115-*b* based on the PRACH preamble, or based on RRC signaling (e.g., from the network entity 105-*b*) indicating the scrambling ID, or both. In such examples, encoding the uplink message may be based on the scrambling identification.

At 915, the UE 115-*b* may encode the uplink message without the DMRS in at least the first portion of the uplink message in accordance with the DMRS configuration. In some examples, the UE 115-*b* may encode, using a RM code, the uplink message without the DMRS included in the first portion in accordance with the DMRS configuration. In some examples, the UE 115-*b* may encode the uplink message without the DMRS in any portion of the uplink message in accordance with the DMRS configuration. In some examples, the UE 115-*b* may encode the first portion of the uplink message in accordance with a PRACH comb pattern based on the DMRS configuration. In some examples, the UE 115-*b* may encode the uplink message to include one or more DMRS in a second portion of the uplink message in accordance with the DMRS configuration. In some examples, the UE 115-*b* may encode the second portion of the uplink message to include the one or more DMRS at a start or at an end of the second portion in accordance with the DMRS configuration. In some examples, the UE 115-*b* may encode the second portion of the uplink message to include the one or more DMRS in a set of frequency resources without RACH signals in accordance with the DMRS configuration. In some examples, the UE 115-*b* may encode the second portion of the uplink message to include the one or more DMRS in a set of frequency resources that include RACH signals in the first portion based on the DMRS configuration.

At 920, the UE 115-*b* may transmit the uplink message based on encoding the uplink message. In some examples, the UE 115-*b* may transmit a PRACH in a first set of frequency resources in the first portion of the uplink message in accordance with the DMRS configuration, and transmit an uplink shared channel (e.g., a PUSCH) in a second set of frequency resources in a second portion of the uplink message in accordance with the DMRS configuration. In some examples, the first set of frequency resources and the second set of frequency resources include a same set of frequency resources or a subset of same frequency resources. In some cases, the DMRS configuration may be based on the first set of frequency resources including the second set of frequency resources. In some cases, the DMRS configuration may be based on the second set of frequency resources including the first set of frequency resources.

In some examples, the network entity 105-*b* may receive a signal including a set of uplink messages from multiple UEs 115 (not illustrated in FIG. 9), where each uplink message of the set of uplink messages may be associated with a RM code.

At 925, the network entity 105-*b* may decode the uplink message based on the DMRS configuration. In examples where the network entity 105-*b* receives the signal including a set of uplink messages from different UEs 115, the network entity 105-*b* may decode, using a respective RM code, the uplink message, where the uplink message may be without the DMRS included in the first portion of the uplink message in accordance with the DMRS configuration. As such, the network entity 105-*b* may cancel the decoded uplink message from the signal including the set of uplink messages in accordance with a multi-user decoding algorithm.

Figure 10:
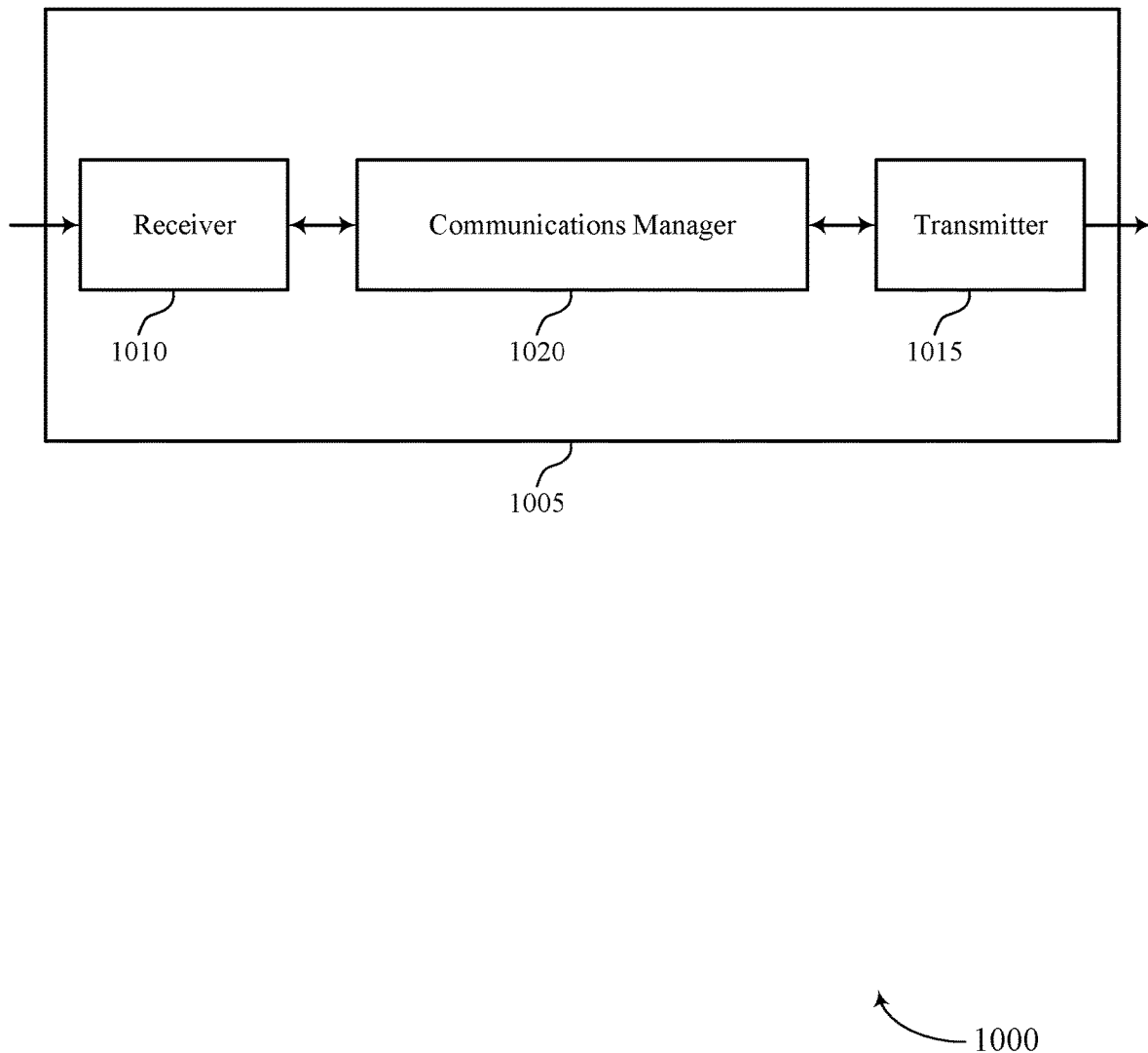
FIGS. 10 and 11 show block diagrams of devices that support DMRS configuration for uplink messages in accordance with one or more aspects of the present disclosure.

FIG. 10 shows a block diagram 1000 of a device 1005 that supports DMRS configuration for uplink messages in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to DMRS configuration for uplink messages). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to DMRS configuration for uplink messages). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of DMRS configuration for uplink messages as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 may be configured as or otherwise support a means for receiving control signaling indicating a DMRS configuration for an uplink message, where the control signaling further indicates that the UE is to refrain from including DMRS in at least a first portion of the uplink message based on the DMRS configuration. The communications manager 1020 may be configured as or otherwise support a means for encoding the uplink message without the DMRS in at least the first portion of the uplink message in accordance with the DMRS configuration. The communications manager 1020 may be configured as or otherwise support a means for transmitting the uplink message based on encoding the uplink message.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reducing bottleneck of DMRS ports by reducing DMRS in an uplink message which may read to reduced signaling overhead, reduced power consumption, and a more efficient utilization of communication resources.

Figure 11:
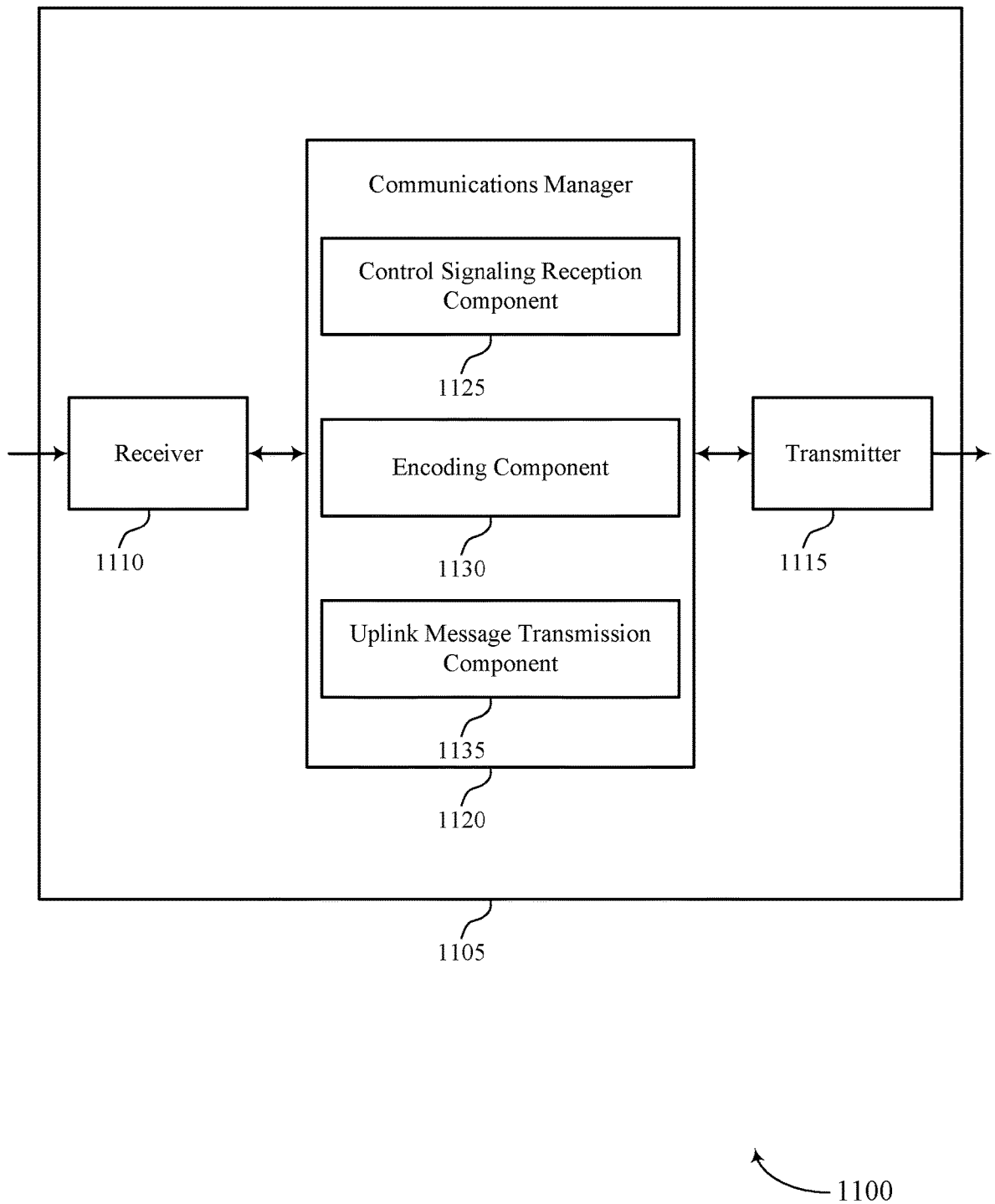

FIG. 11 shows a block diagram 1100 of a device 1105 that supports DMRS configuration for uplink messages in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to DMRS configuration for uplink messages). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to DMRS configuration for uplink messages). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of DMRS configuration for uplink messages as described herein. For example, the communications manager 1120 may include a control signaling reception component 1125, an encoding component 1130, an uplink message transmission component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The control signaling reception component 1125 may be configured as or otherwise support a means for receiving control signaling indicating a DMRS configuration for an uplink message, where the control signaling further indicates that the UE is to refrain from including DMRS in at least a first portion of the uplink message based on the DMRS configuration. The encoding component 1130 may be configured as or otherwise support a means for encoding the uplink message without the DMRS in at least the first portion of the uplink message in accordance with the DMRS configuration. The uplink message transmission component 1135 may be configured as or otherwise support a means for transmitting the uplink message based on encoding the uplink message.

Figure 12:
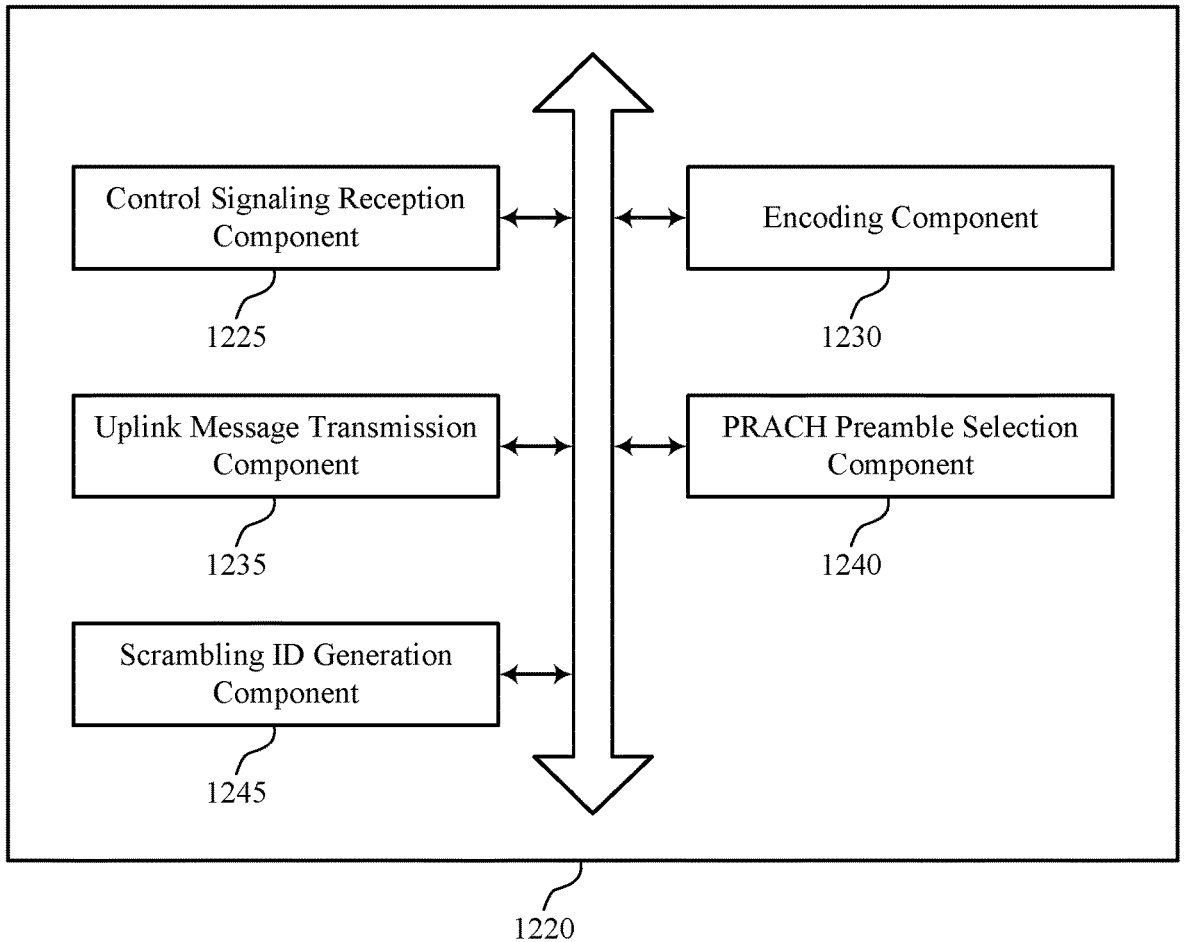
FIG. 12 shows a block diagram of a communications manager that supports DMRS configuration for uplink messages in accordance with one or more aspects of the present disclosure.

FIG. 12 shows a block diagram 1200 of a communications manager 1220 that supports DMRS configuration for uplink messages in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of DMRS configuration for uplink messages as described herein. For example, the communications manager 1220 may include a control signaling reception component 1225, an encoding component 1230, an uplink message transmission component 1235, a PRACH preamble selection component 1240, a scrambling ID generation component 1245, or any combination thereof. Each of these components may communicate, directly or indirectly, with one another (e.g., via one or more buses).

The communications manager 1220 may support wireless communications at a UE in accordance with examples as disclosed herein. The control signaling reception component 1225 may be configured as or otherwise support a means for receiving control signaling indicating a DMRS configuration for an uplink message, where the control signaling further indicates that the UE is to refrain from including DMRS in at least a first portion of the uplink message based on the DMRS configuration. The encoding component 1230 may be configured as or otherwise support a means for encoding the uplink message without the DMRS in at least the first portion of the uplink message in accordance with the DMRS configuration. The uplink message transmission component 1235 may be configured as or otherwise support a means for transmitting the uplink message based on encoding the uplink message.

In some examples, to support encoding the uplink message, the encoding component 1230 may be configured as or otherwise support a means for encoding, using a RM code, the uplink message without the DMRS included in the first portion in accordance with the DMRS configuration.

In some examples, the DMRS configuration includes a field indicating that the UE is to refrain from including the DMRS in the first portion of the uplink message.

In some examples, the DMRS configuration includes a field indicating a LDPC code and a RM code for the UE to use for encoding the uplink message. In some examples, the field is included in an uplink channel resource information element.

In some examples, the PRACH preamble selection component 1240 may be configured as or otherwise support a means for selecting a PRACH preamble to include in the uplink message. In some examples, the scrambling ID generation component 1245 may be configured as or otherwise support a means for generating a scrambling identification associated with the UE based on the PRACH preamble, or based on RRC signaling indicating the scrambling identification, or both, where encoding the uplink message is based on the scrambling identification.

In some examples, to support receiving the DMRS configuration, the control signaling reception component 1225 may be configured as or otherwise support a means for receiving an indication of whether the UE is to include the DMRS in a second portion of the uplink message on a frequency bandwidth that is covered by a RACH of the uplink message, where the RACH is included in the first portion of the uplink message.

In some examples, to support receiving the indication, the control signaling reception component 1225 may be configured as or otherwise support a means for receiving a first configuration indicating for the UE to include one or more demodulated reference signals in each frequency resource of the frequency bandwidth covered by the RACH. In some examples, to support receiving the indication, the control signaling reception component 1225 may be configured as or otherwise support a means for receiving a second configuration indicating for the UE to include the one or more demodulated reference signals in a subset of frequency resources of the frequency bandwidth covered by the RACH. In some examples, to support receiving the indication, the control signaling reception component 1225 may be configured as or otherwise support a means for receiving a third configuration indicating for the UE to refrain from including demodulated reference signals in the second portion of the uplink message.

In some examples, to support receiving the DMRS configuration, the control signaling reception component 1225 may be configured as or otherwise support a means for receiving an indication of a PRACH comb pattern to apply to the first portion of the uplink message.

In some examples, to support encoding the uplink message, the encoding component 1230 may be configured as or otherwise support a means for encoding the uplink message without the DMRS in any portion of the uplink message in accordance with the DMRS configuration.

In some examples, to support encoding the uplink message, the encoding component 1230 may be configured as or otherwise support a means for encoding the first portion of the uplink message in accordance with a PRACH comb pattern based on the DMRS configuration.

In some examples, to support encoding the uplink message, the encoding component 1230 may be configured as or otherwise support a means for encoding the uplink message to include one or more DMRS in a second portion of the uplink message in accordance with the DMRS configuration.

In some examples, to support encoding the uplink message, the encoding component 1230 may be configured as or otherwise support a means for encoding the second portion of the uplink message to include the one or more DMRS at a start or at an end of the second portion in accordance with the DMRS configuration.

In some examples, to support encoding the uplink message, the encoding component 1230 may be configured as or otherwise support a means for encoding the second portion of the uplink message to include the one or more DMRS in a set of frequency resources without RACH signals in accordance with the DMRS configuration.

In some examples, to support encoding the uplink message, the encoding component 1230 may be configured as or otherwise support a means for encoding the second portion of the uplink message to include the one or more DMRS in a set of frequency resources that include RACH signals in the first portion based on the DMRS configuration.

In some examples, the DMRS configuration is based on an amount of Doppler spread at the UE.

In some examples, to support transmitting the uplink message, the uplink message transmission component 1235 may be configured as or otherwise support a means for transmitting a PRACH in a first set of frequency resources in the first portion of the uplink message in accordance with the DMRS configuration. In some examples, to support transmitting the uplink message, the uplink message transmission component 1235 may be configured as or otherwise support a means for transmitting an uplink shared channel in a second set of frequency resources in a second portion of the uplink message in accordance with the DMRS configuration, where the first set of frequency resources and the second set of frequency resources include a same set of frequency resources or a subset of same frequency resources.

In some examples, the DMRS configuration is based on the first set of frequency resources including the second set of frequency resources.

In some examples, the DMRS configuration is based on the second set of frequency resources including the first set of frequency resources.

In some examples, to support receiving the control signaling, the control signaling reception component 1225 may be configured as or otherwise support a means for receiving a RRC message including the DMRS configuration for the uplink message.

Figure 13:
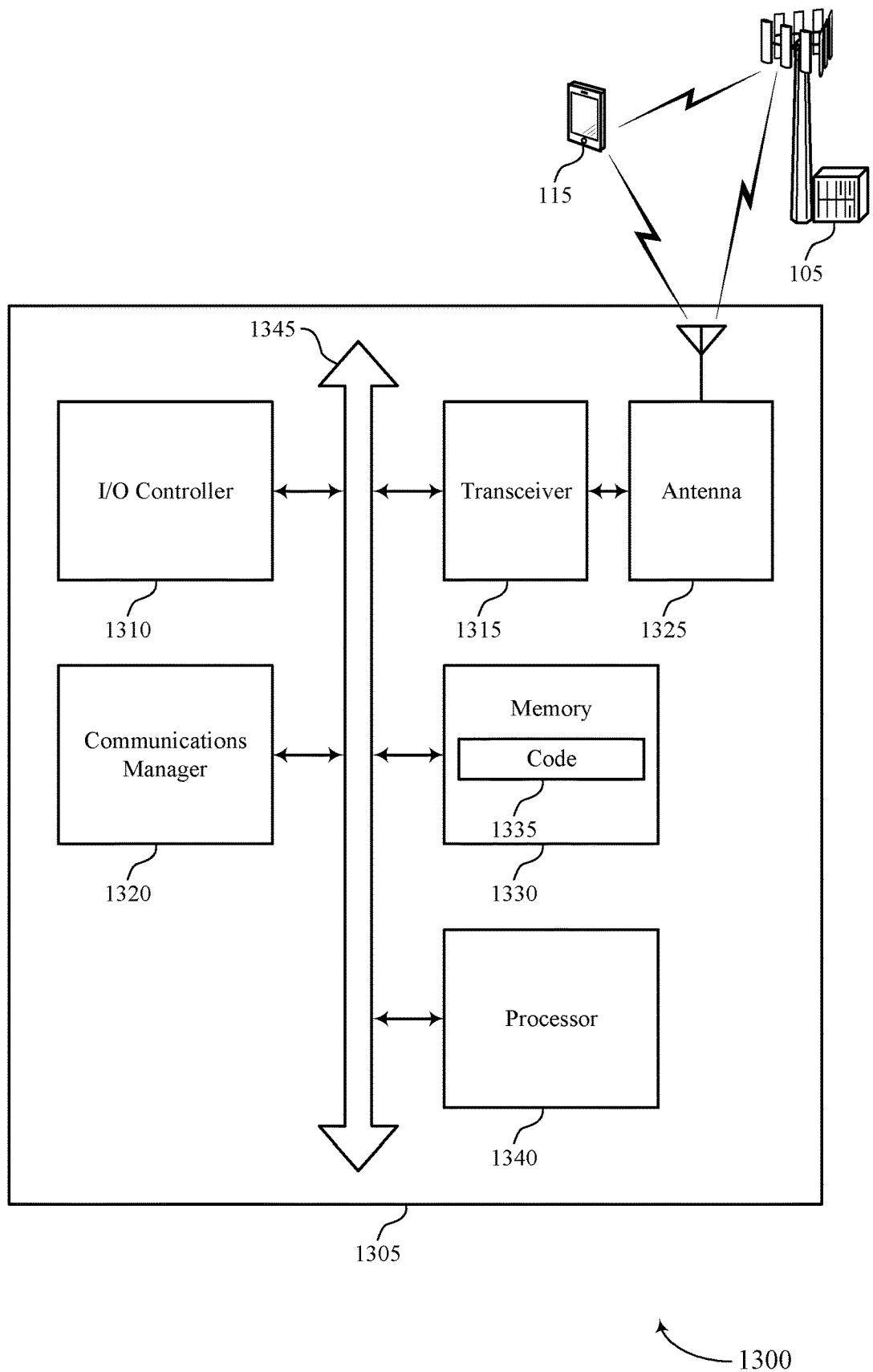
FIG. 13 shows a diagram of a system including a device that supports DMRS configuration for uplink messages in accordance with one or more aspects of the present disclosure.

FIG. 13 shows a diagram of a system 1300 including a device 1305 that supports DMRS configuration for uplink messages in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting DMRS configuration for uplink messages). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving control signaling indicating a DMRS configuration for an uplink message, where the control signaling further indicates that the UE is to refrain from including DMRS in at least a first portion of the uplink message based on the DMRS configuration. The communications manager 1320 may be configured as or otherwise support a means for encoding the uplink message without the DMRS in at least the first portion of the uplink message in accordance with the DMRS configuration. The communications manager 1320 may be configured as or otherwise support a means for transmitting the uplink message based on encoding the uplink message.

By including or configuring the communications manager 1320 in accordance with examples as described herein, the device 1305 may support techniques for reducing bottleneck of DMRS ports by reducing DMRS in an uplink message which may read to reduced signaling overhead, reduced power consumption, improved coordination between devices, longer battery life, improved utilization of processing capability, and a more efficient utilization of communication resources.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of DMRS configuration for uplink messages as described herein, or the processor 1340 and the memory 1330 may be otherwise configured to perform or support such operations.

Figure 14:
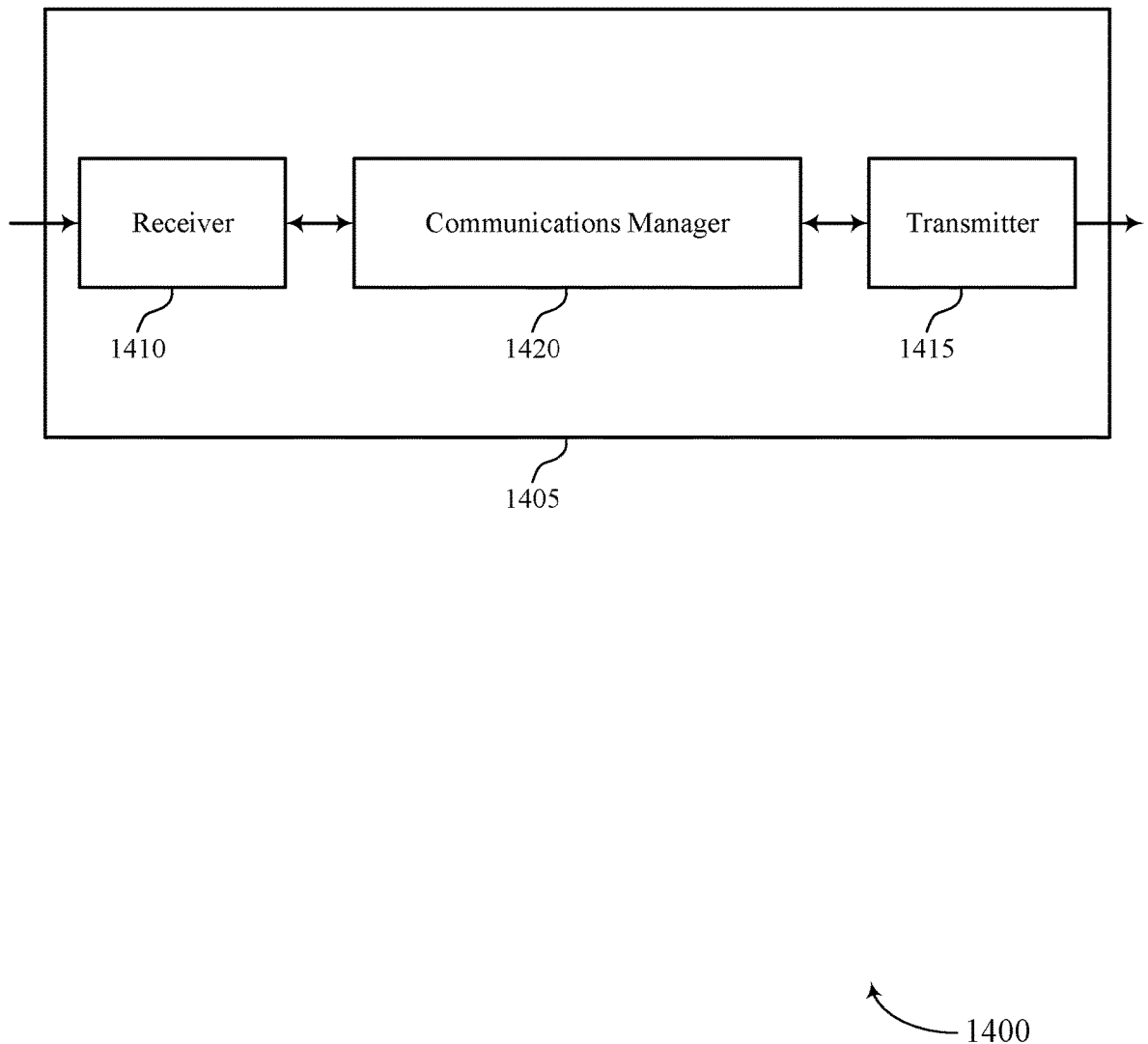
FIGS. 14 and 15 show block diagrams of devices that support DMRS configuration for uplink messages in accordance with one or more aspects of the present disclosure.

FIG. 14 shows a block diagram 1400 of a device 1405 that supports DMRS configuration for uplink messages in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of DMRS configuration for uplink messages as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. For example, the communications manager 1420 may be configured as or otherwise support a means for transmitting control signaling indicating a DMRS configuration for an uplink message, where the control signaling further indicates that a UE is to refrain from including DMRS in at least a first portion of the uplink message based on the DMRS configuration. The communications manager 1420 may be configured as or otherwise support a means for receiving the uplink message without the DMRS in at least the first portion of the uplink message in accordance with the DMRS configuration. The communications manager 1420 may be configured as or otherwise support a means for decoding the uplink message based on the DMRS configuration.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for reducing bottleneck of DMRS ports by reducing DMRS in an uplink message which may read to reduced signaling overhead, reduced power consumption, and a more efficient utilization of communication resources.

Figure 15:
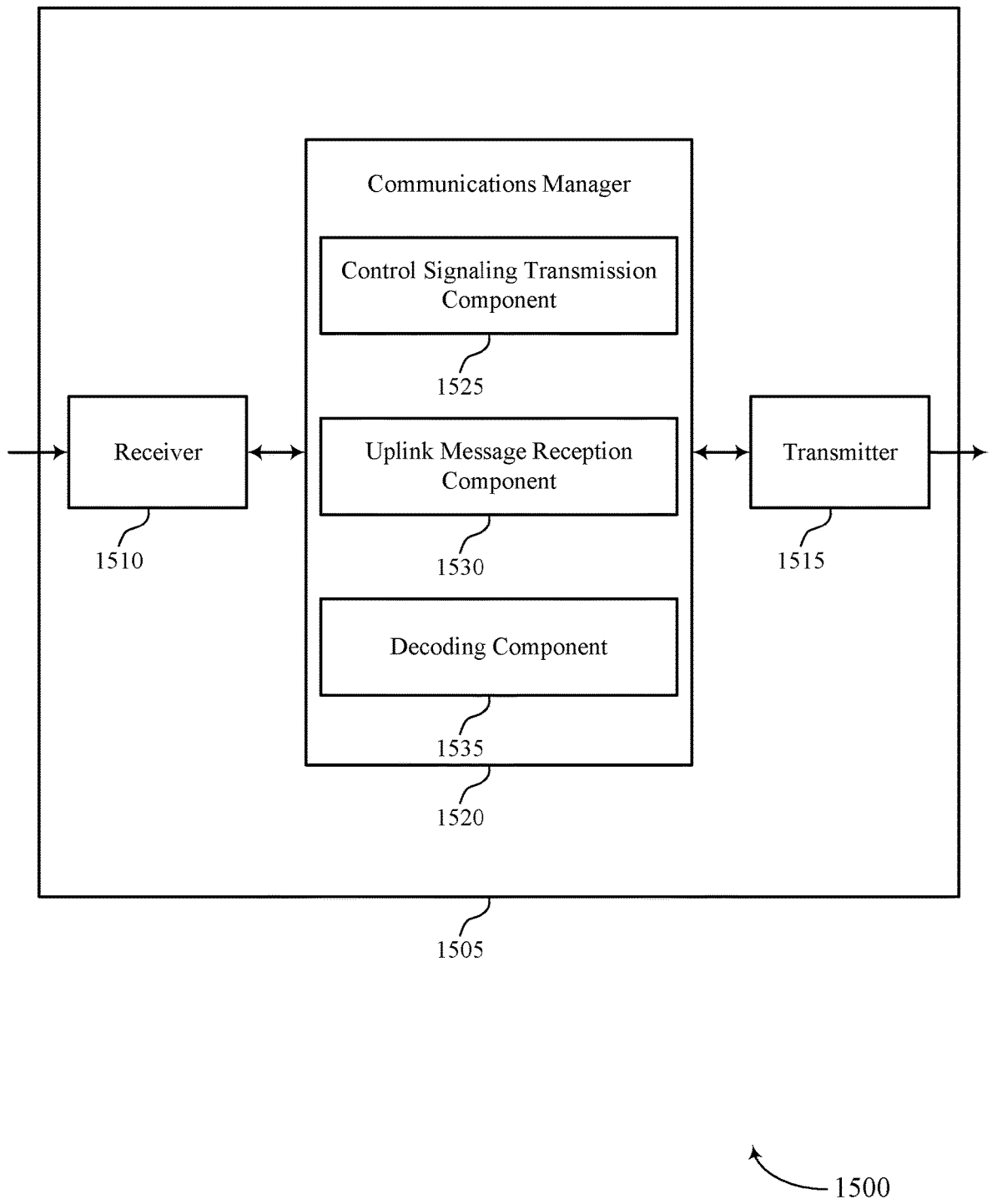

FIG. 15 shows a block diagram 1500 of a device 1505 that supports DMRS configuration for uplink messages in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of DMRS configuration for uplink messages as described herein. For example, the communications manager 1520 may include a control signaling transmission component 1525, an uplink message reception component 1530, a decoding component 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a network entity in accordance with examples as disclosed herein. The control signaling transmission component 1525 may be configured as or otherwise support a means for transmitting control signaling indicating a DMRS configuration for an uplink message, where the control signaling further indicates that a UE is to refrain from including DMRS in at least a first portion of the uplink message based on the DMRS configuration. The uplink message reception component 1530 may be configured as or otherwise support a means for receiving the uplink message without the DMRS in at least the first portion of the uplink message in accordance with the DMRS configuration. The decoding component 1535 may be configured as or otherwise support a means for decoding the uplink message based on the DMRS configuration.

Figure 16:
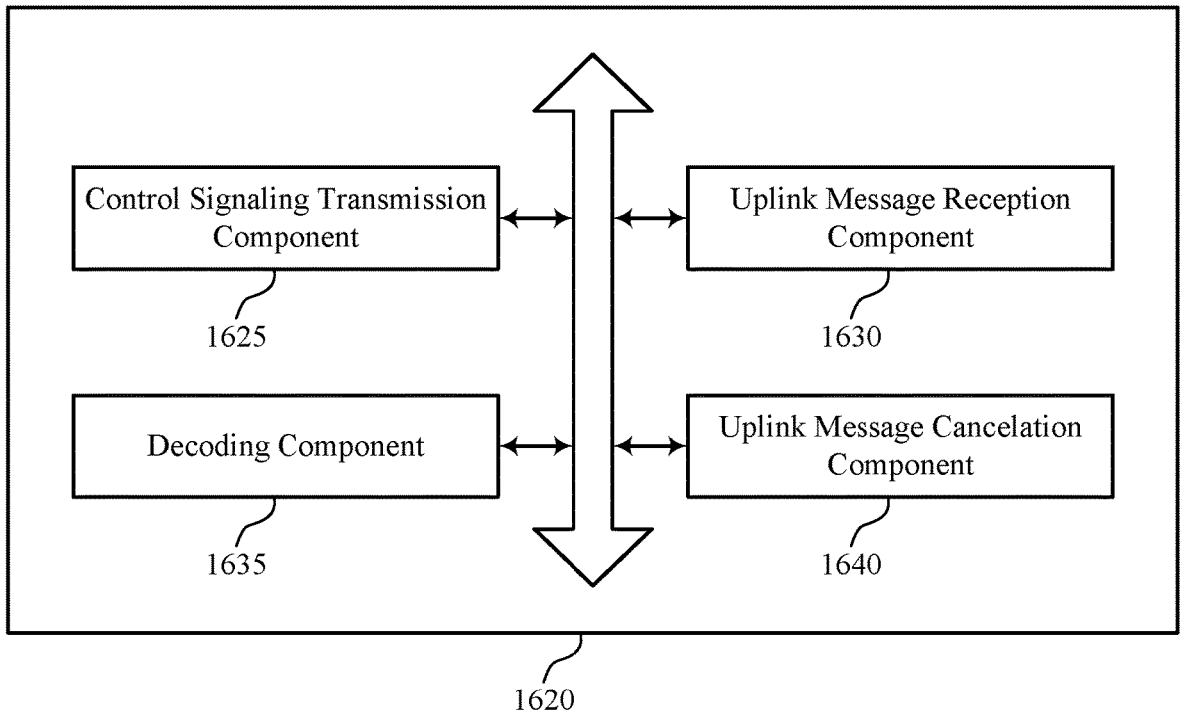
FIG. 16 shows a block diagram of a communications manager that supports DMRS configuration for uplink messages in accordance with one or more aspects of the present disclosure.

FIG. 16 shows a block diagram 1600 of a communications manager 1620 that supports DMRS configuration for uplink messages in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of DMRS configuration for uplink messages as described herein. For example, the communications manager 1620 may include a control signaling transmission component 1625, an uplink message reception component 1630, a decoding component 1635, an uplink message cancelation component 1640, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a network entity in accordance with examples as disclosed herein. The control signaling transmission component 1625 may be configured as or otherwise support a means for transmitting control signaling indicating a DMRS configuration for an uplink message, where the control signaling further indicates that a UE is to refrain from including DMRS in at least a first portion of the uplink message based on the DMRS configuration. The uplink message reception component 1630 may be configured as or otherwise support a means for receiving the uplink message without the DMRS in at least the first portion of the uplink message in accordance with the DMRS configuration. The decoding component 1635 may be configured as or otherwise support a means for decoding the uplink message based on the DMRS configuration.

In some examples, the uplink message reception component 1630 may be configured as or otherwise support a means for receiving a signal including a set of uplink messages from different UEs, where each uplink message of the set of uplink messages is associated with a RM code.

In some examples, to support decoding the uplink message, the decoding component 1635 may be configured as or otherwise support a means for decoding, using a respective RM code, the uplink message, where the uplink message is without the DMRS included in the first portion of the uplink message in accordance with the DMRS configuration. In some examples, to support decoding the uplink message, the uplink message cancelation component 1640 may be configured as or otherwise support a means for canceling the decoded uplink message from the signal including the set of uplink messages in accordance with a multi-user decoding algorithm.

In some examples, the DMRS configuration includes a field indicating a LDPC code and a RM code for the UE to use for encoding the uplink message. In some examples, the field is included in an uplink channel resource information element.

Figure 17:
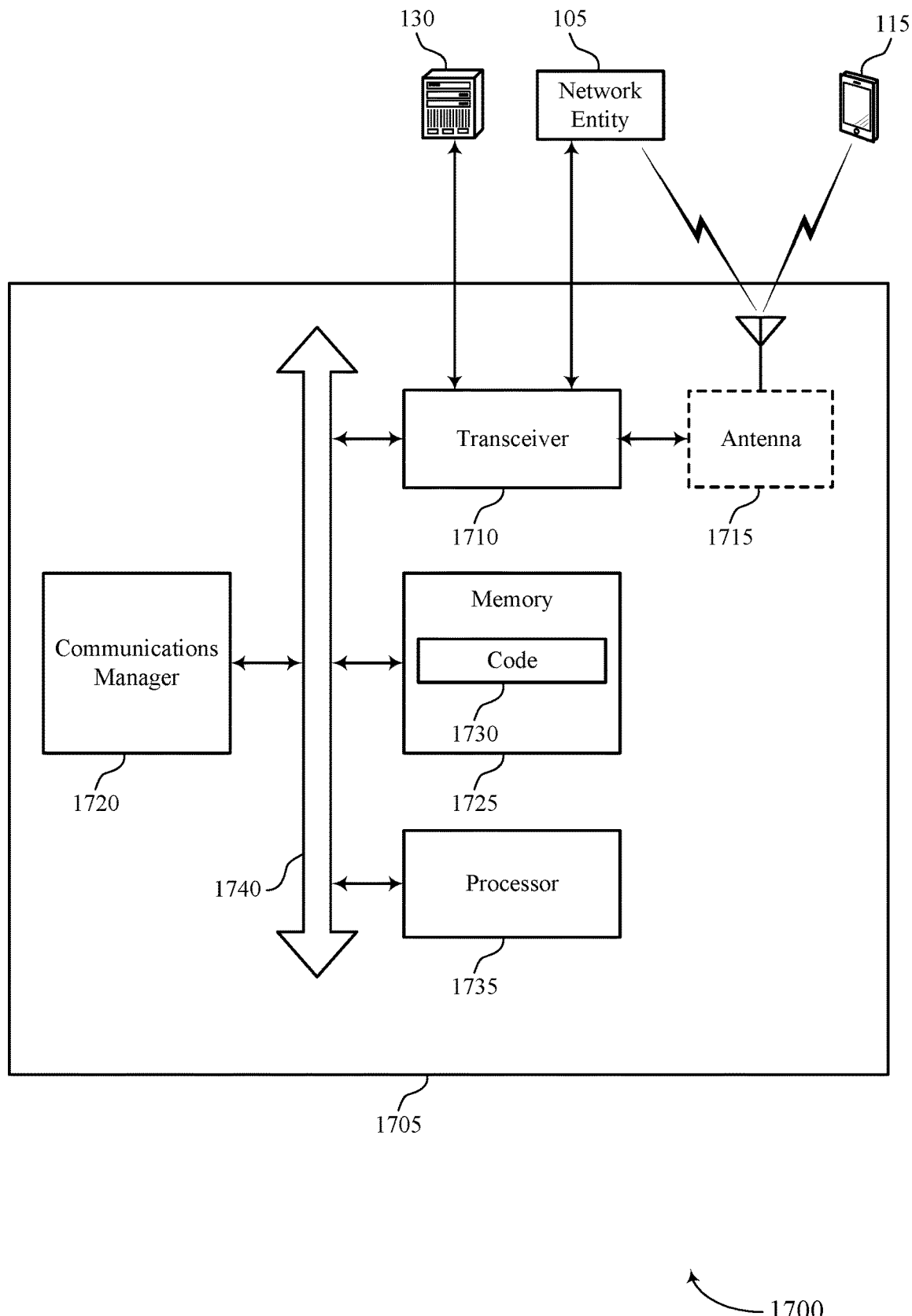
FIG. 17 shows a diagram of a system including a device that supports DMRS configuration for uplink messages in accordance with one or more aspects of the present disclosure.

FIG. 17 shows a diagram of a system 1700 including a device 1705 that supports DMRS configuration for uplink messages in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. The transceiver 1710, or the transceiver 1710 and one or more antennas 1715 or wired interfaces, where applicable, may be an example of a transmitter 1415, a transmitter 1515, a receiver 1410, a receiver 1510, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting DMRS configuration for uplink messages). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications at a network entity in accordance with examples as disclosed herein. For example, the communications manager 1720 may be configured as or otherwise support a means for transmitting control signaling indicating a DMRS configuration for an uplink message, where the control signaling further indicates that a UE is to refrain from including DMRS in at least a first portion of the uplink message based on the DMRS configuration. The communications manager 1720 may be configured as or otherwise support a means for receiving the uplink message without the DMRS in at least the first portion of the uplink message in accordance with the DMRS configuration. The communications manager 1720 may be configured as or otherwise support a means for decoding the uplink message based on the DMRS configuration.

By including or configuring the communications manager 1720 in accordance with examples as described herein, the device 1705 may support techniques for reducing bottleneck of DMRS ports by reducing DMRS in an uplink message which may read to reduced signaling overhead, reduced power consumption, improved coordination between devices, longer battery life, improved utilization of processing capability, and a more efficient utilization of communication resources.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the processor 1735, the memory 1725, the code 1730, the transceiver 1710, or any combination thereof. For example, the code 1730 may include instructions executable by the processor 1735 to cause the device 1705 to perform various aspects of DMRS configuration for uplink messages as described herein, or the processor 1735 and the memory 1725 may be otherwise configured to perform or support such operations.

Figure 18:
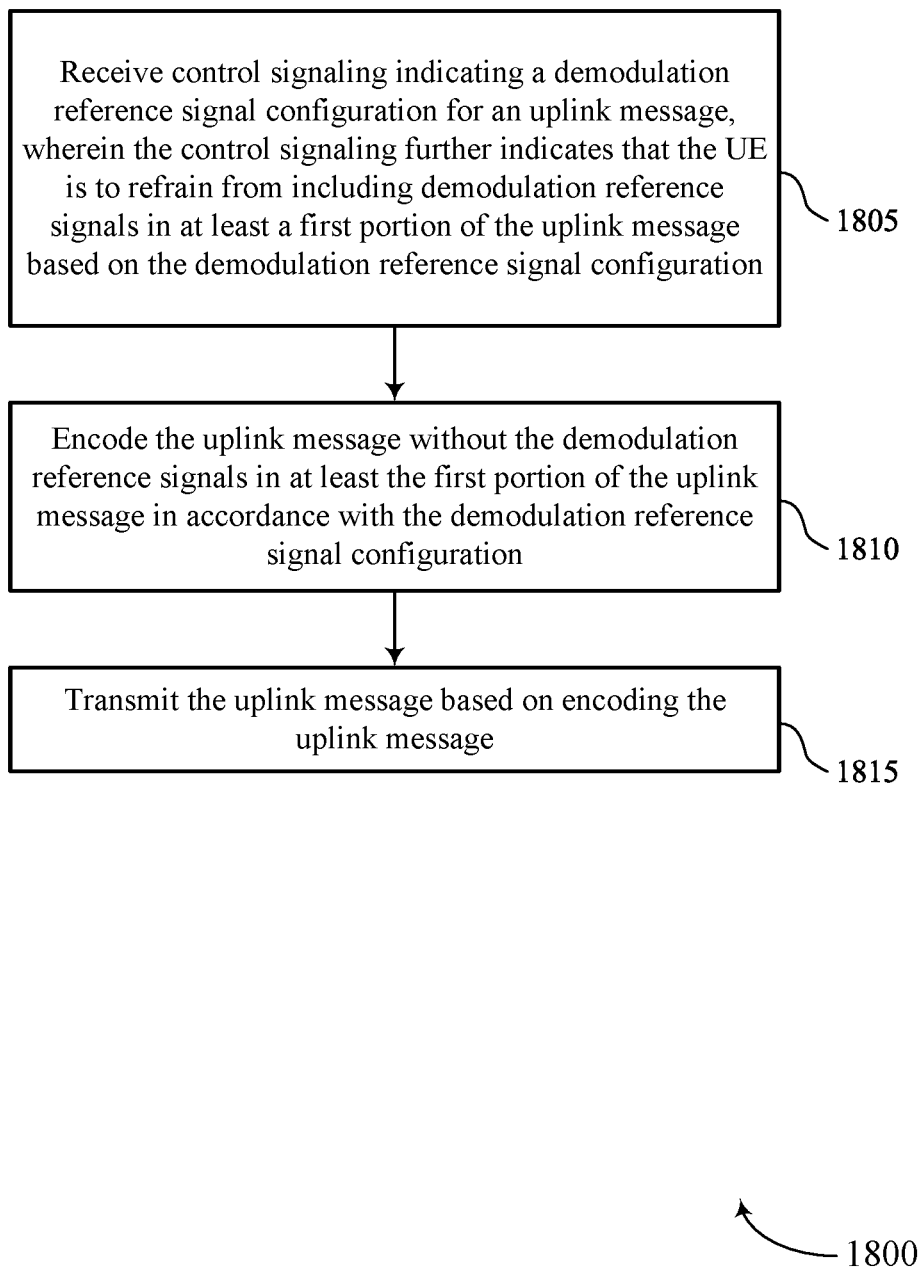
FIGS. 18 through 21 show flowcharts illustrating methods that support DMRS configuration for uplink messages in accordance with one or more aspects of the present disclosure.

FIG. 18 shows a flowchart illustrating a method 1800 that supports DMRS configuration for uplink messages in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving control signaling indicating a DMRS configuration for an uplink message, where the control signaling further indicates that the UE is to refrain from including DMRS in at least a first portion of the uplink message based on the DMRS configuration. The operations of 1805 may be performed in accordance with examples as disclosed herein. In some examples, aspects of the operations of 1805 may be performed by a control signaling reception component 1225 as described with reference to FIG. 12.

At 1810, the method may include encoding the uplink message without the DMRS in at least the first portion of the uplink message in accordance with the DMRS configuration. The operations of 1810 may be performed in accordance with examples as disclosed herein. In some examples, aspects of the operations of 1810 may be performed by an encoding component 1230 as described with reference to FIG. 12.

At 1815, the method may include transmitting the uplink message based on encoding the uplink message. The operations of 1815 may be performed in accordance with examples as disclosed herein. In some examples, aspects of the operations of 1815 may be performed by an uplink message transmission component 1235 as described with reference to FIG. 12.

Figure 19:
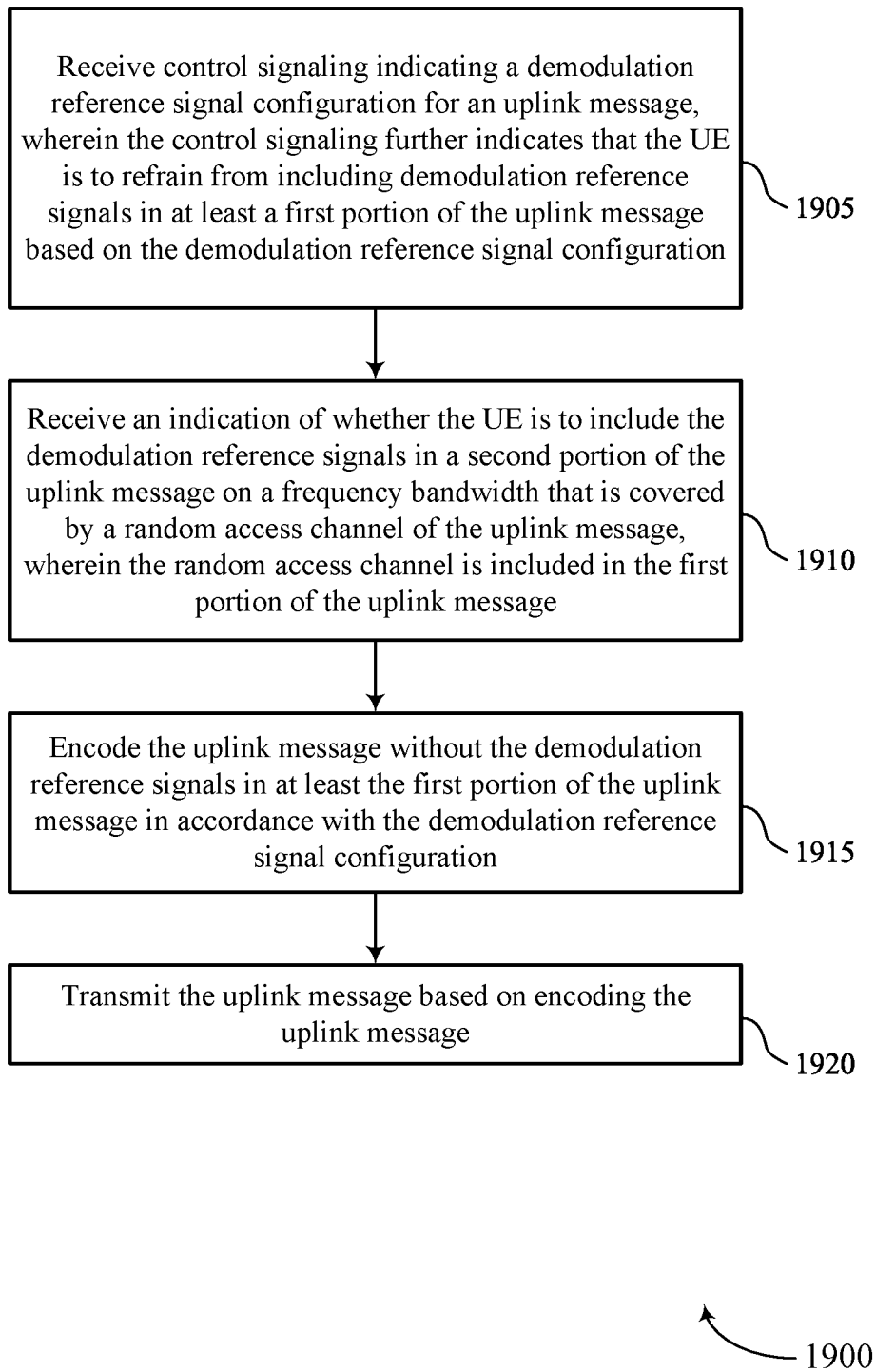

FIG. 19 shows a flowchart illustrating a method 1900 that supports DMRS configuration for uplink messages in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving control signaling indicating a DMRS configuration for an uplink message, where the control signaling further indicates that the UE is to refrain from including DMRS in at least a first portion of the uplink message based on the DMRS configuration. The operations of 1905 may be performed in accordance with examples as disclosed herein. In some examples, aspects of the operations of 1905 may be performed by a control signaling reception component 1225 as described with reference to FIG. 12.

At 1910, the method may include receiving an indication of whether the UE is to include the DMRS in a second portion of the uplink message on a frequency bandwidth that is covered by a RACH of the uplink message, where the RACH is included in the first portion of the uplink message. The operations of 1910 may be performed in accordance with examples as disclosed herein. In some examples, aspects of the operations of 1910 may be performed by a control signaling reception component 1225 as described with reference to FIG. 12.

At 1915, the method may include encoding the uplink message without the DMRS in at least the first portion of the uplink message in accordance with the DMRS configuration. The operations of 1915 may be performed in accordance with examples as disclosed herein. In some examples, aspects of the operations of 1915 may be performed by an encoding component 1230 as described with reference to FIG. 12.

At 1920, the method may include transmitting the uplink message based on encoding the uplink message. The operations of 1920 may be performed in accordance with examples as disclosed herein. In some examples, aspects of the operations of 1920 may be performed by an uplink message transmission component 1235 as described with reference to FIG. 12.

Figure 20:
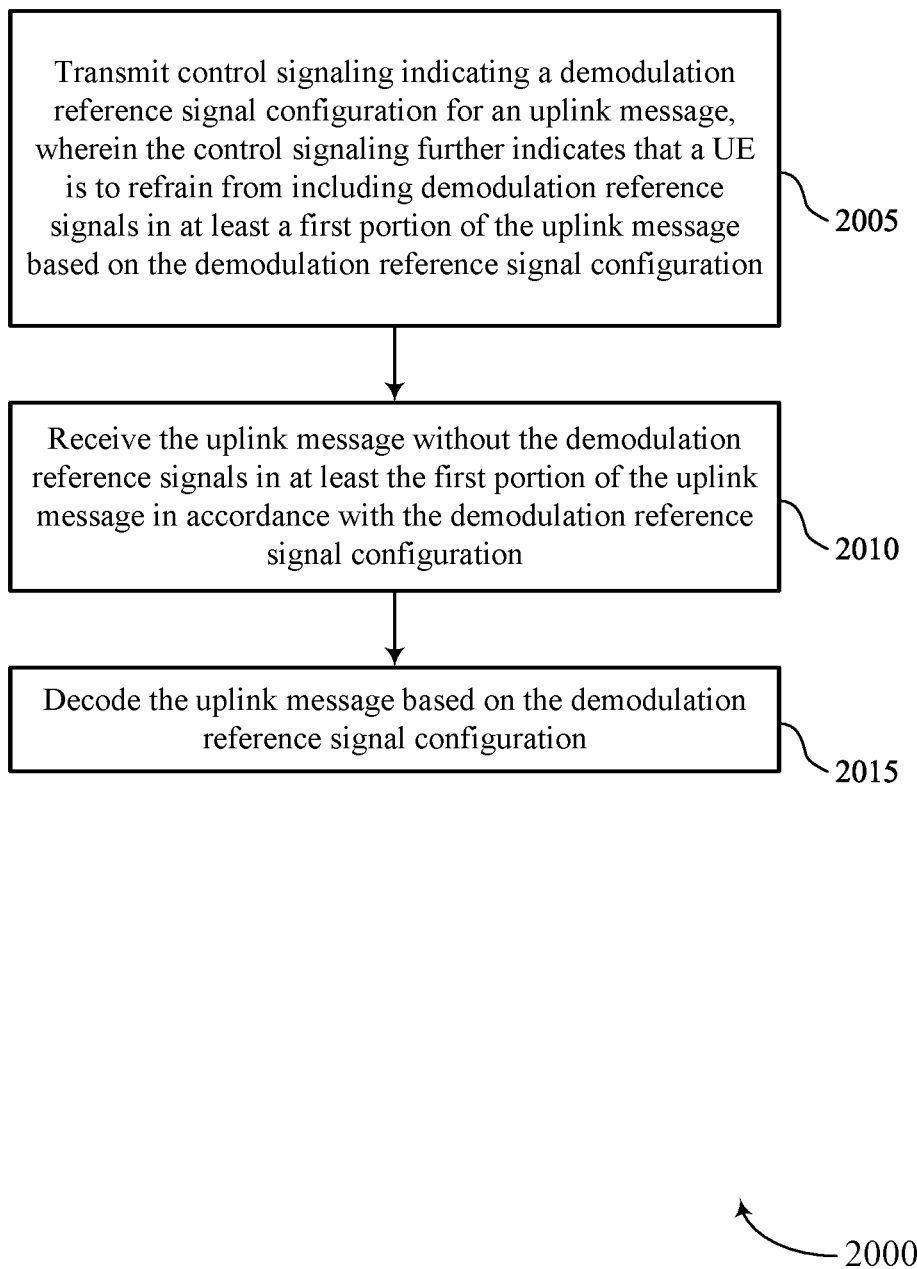

FIG. 20 shows a flowchart illustrating a method 2000 that supports DMRS configuration for uplink messages in accordance with one or more aspects of the present disclosure. The operations of the method 2000 may be implemented by a network entity or its components as described herein. For example, the operations of the method 2000 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2005, the method may include transmitting control signaling indicating a DMRS configuration for an uplink message, where the control signaling further indicates that a UE is to refrain from including DMRS in at least a first portion of the uplink message based on the DMRS configuration. The operations of 2005 may be performed in accordance with examples as disclosed herein. In some examples, aspects of the operations of 2005 may be performed by a control signaling transmission component 1625 as described with reference to FIG. 16.

At 2010, the method may include receiving the uplink message without the DMRS in at least the first portion of the uplink message in accordance with the DMRS configuration. The operations of 2010 may be performed in accordance with examples as disclosed herein. In some examples, aspects of the operations of 2010 may be performed by an uplink message reception component 1630 as described with reference to FIG. 16.

At 2015, the method may include decoding the uplink message based on the DMRS configuration. The operations of 2015 may be performed in accordance with examples as disclosed herein. In some examples, aspects of the operations of 2015 may be performed by a decoding component 1635 as described with reference to FIG. 16.

Figure 21:
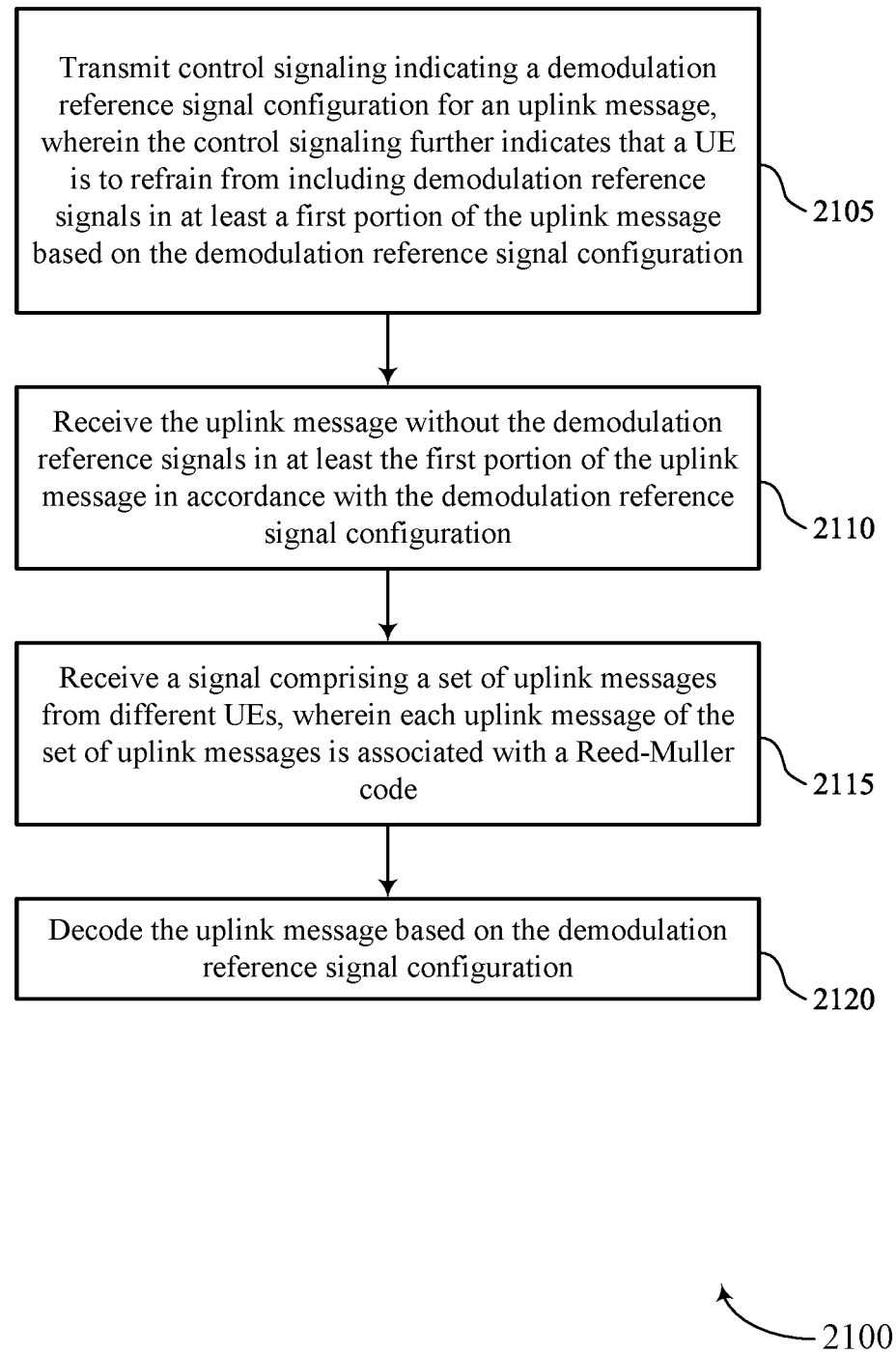

FIG. 21 shows a flowchart illustrating a method 2100 that supports DMRS configuration for uplink messages in accordance with one or more aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include transmitting control signaling indicating a DMRS configuration for an uplink message, where the control signaling further indicates that a UE is to refrain from including DMRS in at least a first portion of the uplink message based on the DMRS configuration. The operations of 2105 may be performed in accordance with examples as disclosed herein. In some examples, aspects of the operations of 2105 may be performed by a control signaling transmission component 1625 as described with reference to FIG. 16.

At 2110, the method may include receiving the uplink message without the DMRS in at least the first portion of the uplink message in accordance with the DMRS configuration. The operations of 2110 may be performed in accordance with examples as disclosed herein. In some examples, aspects of the operations of 2110 may be performed by an uplink message reception component 1630 as described with reference to FIG. 16.

At 2115, the method may include receiving a signal including a set of uplink messages from different UEs, where each uplink message of the set of uplink messages is associated with a RM code. The operations of 2115 may be performed in accordance with examples as disclosed herein. In some examples, aspects of the operations of 2115 may be performed by an uplink message reception component 1630 as described with reference to FIG. 16.

At 2120, the method may include decoding the uplink message based on the DMRS configuration. The operations of 2120 may be performed in accordance with examples as disclosed herein. In some examples, aspects of the operations of 2120 may be performed by a decoding component 1635 as described with reference to FIG. 16.

The following provides an overview of aspects of the present disclosure:

Aspect 1: A method for wireless communications at a UE, comprising: receiving control signaling indicating a DMRS configuration for an uplink message, wherein the control signaling further indicates that the UE is to refrain from including DMRSs in at least a first portion of the uplink message based at least in part on the DMRS configuration; encoding the uplink message without the DMRSs in at least the first portion of the uplink message in accordance with the DMRS configuration; and transmitting the uplink message based at least in part on encoding the uplink message.

Aspect 2: The method of aspect 1, wherein encoding the uplink message further comprises: encoding, using a RM code, the uplink message without the DMRSs included in the first portion in accordance with the DMRS configuration.

Aspect 3: The method of any of aspects 1 through 2, wherein the DMRS configuration comprises a field indicating that the UE is to refrain from including the DMRSs in the first portion of the uplink message.

Aspect 4: The method of any of aspects 1 through 3, wherein the DMRS configuration comprises a field indicating a low-density parity-check code and a RM code for the UE to use for encoding the uplink message, the field is included in an uplink channel resource information element.

Aspect 5: The method of any of aspects 1 through 4, further comprising: selecting a PRACH preamble to include in the uplink message; and generating a scrambling identification associated with the UE based at least in part on the PRACH preamble, or based on RRC signaling indicating the scrambling identification, or both, wherein encoding the uplink message is based at least in part on the scrambling identification.

Aspect 6: The method of any of aspects 1 through 5, wherein receiving the DMRS configuration further comprises: receiving an indication of whether the UE is to include the DMRSs in a second portion of the uplink message on a frequency bandwidth that is covered by a random access channel of the uplink message, wherein the random access channel is included in the first portion of the uplink message.

Aspect 7: The method of aspect 6, wherein receiving the indication further comprises: receiving a first configuration indicating for the UE to include one or more demodulated reference signals in each frequency resource of the frequency bandwidth covered by the random access channel; receiving a second configuration indicating for the UE to include the one or more demodulated reference signals in a subset of frequency resources of the frequency bandwidth covered by the random access channel;

or receiving a third configuration indicating for the UE to refrain from including demodulated reference signals in the second portion of the uplink message.

Aspect 8: The method of any of aspects 1 through 7, wherein receiving the DMRS configuration comprises: receiving an indication of a PRACH comb pattern to apply to the first portion of the uplink message.

Aspect 9: The method of any of aspects 1 through 8, wherein encoding the uplink message further comprises: encoding the uplink message without the DMRSs in any portion of the uplink message in accordance with the DMRS configuration.

Aspect 10: The method of any of aspects 1 through 9, wherein encoding the uplink message further comprises: encoding the first portion of the uplink message in accordance with a PRACH comb pattern based at least in part on the DMRS configuration.

Aspect 11: The method of any of aspects 1 through 10, wherein encoding the uplink message further comprises: encoding the uplink message to include one or more DMRSs in a second portion of the uplink message in accordance with the DMRS configuration.

Aspect 12: The method of aspect 11, wherein encoding the uplink message further comprises: encoding the second portion of the uplink message to include the one or more DMRSs at a start or at an end of the second portion in accordance with the DMRS configuration.

Aspect 13: The method of any of aspects 11 through 12, wherein encoding the uplink message further comprises: encoding the second portion of the uplink message to include the one or more DMRSs in a set of frequency resources without random access channel signals in accordance with the DMRS configuration.

Aspect 14: The method of any of aspects 11 through 13, wherein encoding the uplink message further comprises: encoding the second portion of the uplink message to include the one or more DMRSs in a set of frequency resources that include random access channel signals in the first portion based at least in part on the DMRS configuration.

Aspect 15: The method of any of aspects 1 through 14, wherein the DMRS configuration is based at least in part on an amount of Doppler spread at the UE.

Aspect 16: The method of any of aspects 1 through 15, wherein transmitting the uplink message further comprises: transmitting a PRACH in a first set of frequency resources in the first portion of the uplink message in accordance with the DMRS configuration; and transmitting an uplink shared channel in a second set of frequency resources in a second portion of the uplink message in accordance with the DMRS configuration, wherein the first set of frequency resources and the second set of frequency resources comprise a same set of frequency resources or a subset of same frequency resources.

Aspect 17: The method of aspect 16, wherein the DMRS configuration is based at least in part on the first set of frequency resources including the second set of frequency resources.

Aspect 18: The method of any of aspects 16 through 17, wherein the DMRS configuration is based at least in part on the second set of frequency resources including the first set of frequency resources.

Aspect 19: The method of any of aspects 1 through 18, wherein receiving the control signaling further comprises: receiving a RRC message comprising the DMRS configuration for the uplink message.

Aspect 20: A method for wireless communications at a network entity, comprising: transmitting control signaling indicating a DMRS configuration for an uplink message, wherein the control signaling further indicates that a UE is to refrain from including DMRSs in at least a first portion of the uplink message based at least in part on the DMRS configuration; receiving the uplink message without the DMRSs in at least the first portion of the uplink message in accordance with the DMRS configuration; and decoding the uplink message based at least in part on the DMRS configuration.

Aspect 21: The method of aspect 20, further comprising: receiving a signal comprising a set of uplink messages from different UEs, wherein each uplink message of the set of uplink messages is associated with a RM code.

Aspect 22: The method of aspect 21, wherein decoding the uplink message further comprises: decoding, using a respective RM code, the uplink message, wherein the uplink message is without the DMRSs included in the first portion of the uplink message in accordance with the DMRS configuration; and canceling the decoded uplink message from the signal comprising the set of uplink messages in accordance with a multi-user decoding algorithm.

Aspect 23: The method of any of aspects 20 through 22, wherein the DMRS configuration comprises a field indicating a low-density parity-check code and a RM code for the UE to use for encoding the uplink message, the field is included in an uplink channel resource information element.

Aspect 24: An apparatus for wireless communications at a UE, comprising a processor; memory coupled with the processor; and instructions stored in the memory and executable by the processor to cause the apparatus to perform a method of any of aspects 1 through 19.

Aspect 25: An apparatus for wireless communications at a UE, comprising at least one means for performing a method of any of aspects 1 through 19.

Aspect 26: A non-transitory computer-readable medium storing code for wireless communications at a UE, the code comprising instructions executable by a processor to perform a method of any of aspects 1 through 19.

Aspect 27: An apparatus for wireless communications at a network entity, comprising a processor; memory coupled with the processor; and instructions stored in the memory and executable by the processor to cause the apparatus to perform a method of any of aspects 20 through 23.

Aspect 28: An apparatus for wireless communications at a network entity, comprising at least one means for performing a method of any of aspects 20 through 23.

Aspect 29: A non-transitory computer-readable medium storing code for wireless communications at a network entity, the code comprising instructions executable by a processor to perform a method of any of aspects 20 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving control signaling indicating a demodulation reference signal configuration for an uplink message, wherein the demodulation reference signal configuration indicates a low-density parity-check code and a Reed-Muller code for the UE to use for encoding the uplink message or the demodulation reference signal configuration indicates a physical random access channel comb pattern for the UE to apply to a first portion of the uplink message, and wherein the control signaling further indicates that the UE is to refrain from including demodulation reference signals in at least the first portion of the uplink message based at least in part on the demodulation reference signal configuration, wherein refraining from including the demodulation reference signals in at least the first portion of the uplink message is associated with a channel estimation for a second portion of the uplink message;
    encoding the uplink message without the demodulation reference signals in at least the first portion of the uplink message in accordance with the demodulation reference signal configuration; and
    transmitting the uplink message based at least in part on encoding the uplink message.

2. The method of claim 1, wherein encoding the uplink message further comprises:
    encoding, using the Reed-Muller code, the uplink message without the demodulation reference signals included in the first portion in accordance with the demodulation reference signal configuration.

3. The method of claim 1, wherein the demodulation reference signal configuration comprises a field indicating that the UE is to refrain from including the demodulation reference signals in the first portion of the uplink message.

4. The method of claim 1, wherein the demodulation reference signal configuration comprises a field indicating the low-density parity-check code and the Reed-Muller code for the UE to use for encoding the uplink message, wherein the field is included in an uplink channel resource information element.

5. The method of claim 1, further comprising:
    selecting a physical random access channel preamble to include in the uplink message; and
    generating a scrambling identification associated with the UE based at least in part on the physical random access channel preamble, or based on radio resource control signaling indicating the scrambling identification, or both, wherein encoding the uplink message is based at least in part on the scrambling identification.

6. The method of claim 1, wherein receiving the demodulation reference signal configuration further comprises:
receiving an indication of whether the UE is to include the demodulation reference signals in the second portion of the uplink message on a frequency bandwidth that is covered by a random access channel of the uplink message, wherein the random access channel is included in the first portion of the uplink message.

7. The method of claim 6, wherein receiving the indication further comprises:
receiving a first configuration indicating for the UE to include one or more demodulated reference signals in each frequency resource of the frequency bandwidth covered by the random access channel;
receiving a second configuration indicating for the UE to include the one or more demodulated reference signals in a subset of frequency resources of the frequency bandwidth covered by the random access channel; or
receiving a third configuration indicating for the UE to refrain from including demodulated reference signals in the second portion of the uplink message.

8. The method of claim 1, wherein encoding the uplink message further comprises:
encoding the uplink message without the demodulation reference signals in any portion of the uplink message in accordance with the demodulation reference signal configuration.

9. The method of claim 1, wherein encoding the uplink message further comprises:
encoding the first portion of the uplink message in accordance with the physical random access channel comb pattern based at least in part on the demodulation reference signal configuration.

10. The method of claim 1, wherein encoding the uplink message further comprises:
encoding the uplink message to include one or more demodulation reference signals in the second portion of the uplink message in accordance with the demodulation reference signal configuration.

11. The method of claim 10, wherein encoding the uplink message further comprises:
encoding the second portion of the uplink message to include the one or more demodulation reference signals at a start or at an end of the second portion in accordance with the demodulation reference signal configuration.

12. The method of claim 10, wherein encoding the uplink message further comprises:
encoding the second portion of the uplink message to include the one or more demodulation reference signals in a set of frequency resources without random access channel signals in accordance with the demodulation reference signal configuration.

13. The method of claim 10, wherein encoding the uplink message further comprises:
encoding the second portion of the uplink message to include the one or more demodulation reference signals in a set of frequency resources that include random access channel signals in the first portion based at least in part on the demodulation reference signal configuration.

14. The method of claim 1, wherein the demodulation reference signal configuration is based at least in part on an amount of Doppler spread at the UE.

15. The method of claim 1, wherein transmitting the uplink message further comprises:
transmitting a physical random access channel in a first set of frequency resources in the first portion of the uplink message in accordance with the demodulation reference signal configuration; and
transmitting an uplink shared channel in a second set of frequency resources in the second portion of the uplink message in accordance with the demodulation reference signal configuration, wherein the first set of frequency resources and the second set of frequency resources comprise a same set of frequency resources or a subset of same frequency resources.

16. The method of claim 15, wherein the demodulation reference signal configuration is based at least in part on the first set of frequency resources including the second set of frequency resources.

17. The method of claim 15, wherein the demodulation reference signal configuration is based at least in part on the second set of frequency resources including the first set of frequency resources.

18. The method of claim 1, wherein receiving the control signaling further comprises:
receiving a radio resource control message comprising the demodulation reference signal configuration for the uplink message.

19. A method for wireless communications at a network entity, comprising:
transmitting control signaling indicating a demodulation reference signal configuration for an uplink message, wherein the demodulation reference signal configuration indicates a low-density parity-check code and a first Reed-Muller code for a user equipment (UE) to use for encoding the uplink message or the demodulation reference signal configuration indicates a physical random access channel comb pattern for the UE to apply to a first portion of the uplink message, and wherein the control signaling further indicates that the UE is to refrain from including demodulation reference signals in at least the first portion of the uplink message based at least in part on the demodulation reference signal configuration, wherein refraining from including the demodulation reference signals in at least the first portion of the uplink message is associated with a channel estimation for a second portion of the uplink message;
receiving the uplink message without the demodulation reference signals in at least the first portion of the uplink message in accordance with the demodulation reference signal configuration; and
decoding the uplink message based at least in part on the demodulation reference signal configuration.

20. The method of claim 19, further comprising:
receiving a signal comprising a set of uplink messages from different UEs, wherein each uplink message of the set of uplink messages is associated with a respective Reed-Muller code.

21. The method of claim 20, wherein decoding the uplink message further comprises:
decoding, using the first Reed-Muller code, the uplink message, wherein the uplink message is without the demodulation reference signals included in the first portion of the uplink message in accordance with the demodulation reference signal configuration; and
canceling the decoded uplink message from the signal comprising the set of uplink messages in accordance with a multi-user decoding algorithm.

22. The method of claim 19, wherein the demodulation reference signal configuration comprises a field indicating the low-density parity-check code and the first Reed-Muller code for the UE to use for encoding the uplink message, wherein the field is included in an uplink channel resource information element.

23. An apparatus for wireless communications at a user equipment (UE), comprising:
one or more processors;
memory coupled with the one or more processors; and
instructions stored in the memory and executable by the one or more processors to cause the apparatus to:
receive control signaling indicating a demodulation reference signal configuration for an uplink message, wherein the demodulation reference signal configuration indicates a low-density parity-check code and a Reed-Muller code for the UE to use for encoding the uplink message or the demodulation reference signal configuration indicates a physical random access channel comb pattern for the UE to apply to a first portion of the uplink message, and wherein the control signaling further indicates that the UE is to refrain from including demodulation reference signals in at least the first portion of the uplink message based at least in part on the demodulation reference signal configuration, wherein refraining from including the demodulation reference signals in at least the first portion of the uplink message is associated with a channel estimation for a second portion of the uplink message;
encode the uplink message without the demodulation reference signals in at least the first portion of the uplink message in accordance with the demodulation reference signal configuration; and
transmit the uplink message based at least in part on encoding the uplink message.

24. The apparatus of claim 23, wherein the instructions to encode the uplink message are further executable by the one or more processors to cause the apparatus to:
encode, using the Reed-Muller code, the uplink message without the demodulation reference signals included in the first portion in accordance with the demodulation reference signal configuration.

25. The apparatus of claim 23, wherein the demodulation reference signal configuration comprises a field indicating that the UE is to refrain from including the demodulation reference signals in the first portion of the uplink message.

26. An apparatus for wireless communications at a network entity, comprising:
one or more processors;
memory coupled with the one or more processors; and
instructions stored in the memory and executable by the one or more processors to cause the apparatus to:
transmit control signaling indicating a demodulation reference signal configuration for an uplink message, wherein the demodulation reference signal configuration indicates a low-density parity-check code and a first Reed-Muller code for a user equipment (UE) to use for encoding the uplink message or the demodulation reference signal configuration indicates a physical random access channel comb pattern for the UE to apply to a first portion of the uplink message, and wherein the control signaling further indicates that the UE is to refrain from including demodulation reference signals in at least the first portion of the uplink message based at least in part on the demodulation reference signal configuration, wherein refraining from including the demodulation reference signals in at least the first portion of the uplink message is associated with a channel estimation for a second portion of the uplink message;
receive the uplink message without the demodulation reference signals in at least the first portion of the uplink message in accordance with the demodulation reference signal configuration; and
decode the uplink message based at least in part on the demodulation reference signal configuration.

27. The apparatus of claim 26, wherein the instructions are further executable by the one or more processors to cause the apparatus to:
receive a signal comprising a set of uplink messages from different UEs, wherein each uplink message of the set of uplink messages is associated with a respective Reed-Muller code.

28. The apparatus of claim 27, wherein the instructions to decode the uplink message are further executable by the one or more processors to cause the apparatus to:
decode, using the first Reed-Muller code, the uplink message, wherein the uplink message is without the demodulation reference signals included in the first portion of the uplink message in accordance with the demodulation reference signal configuration; and
cancel the decoded uplink message from the signal comprising the set of uplink messages in accordance with a multi-user decoding algorithm.

29. The apparatus of claim 26, wherein the demodulation reference signal configuration comprises a field indicating the low-density parity-check code and the first Reed-Muller code for the UE to use for encoding the uplink message, wherein the field is included in an uplink channel resource information element.

* * * * *